United States Patent
Brown et al.

(10) Patent No.: US 9,894,468 B2
(45) Date of Patent: Feb. 13, 2018

(54) APPARATUS FOR SELECTIVELY COUPLING AN ENERGY STORAGE DEVICE

(71) Applicant: NXP USA, INC., Austin, TX (US)

(72) Inventors: Robert Brown, Cambridge (GB); Peter Robert Symons, Cambridge (GB)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/070,758

(22) Filed: Mar. 15, 2016

(65) Prior Publication Data

US 2016/0234631 A1    Aug. 11, 2016

Related U.S. Application Data

(63) Continuation of application No. 11/918,173, filed as application No. PCT/GB2006/001299 on Apr. 11, 2006, now Pat. No. 9,301,337.

(30) Foreign Application Priority Data

Apr. 11, 2005  (GB) .................................. 0507285.5
Aug. 11, 2005  (GB) .................................. 0516517.0

(51) Int. Cl.
*H04W 4/00*  (2009.01)
*H02J 7/02*  (2016.01)
(Continued)

(52) U.S. Cl.
CPC ........... *H04W 4/008* (2013.01); *H02J 7/0052* (2013.01); *H02J 7/025* (2013.01); *H04B 5/0037* (2013.01);
(Continued)

(58) Field of Classification Search
None
See application file for complete search history.

(56) References Cited

U.S. PATENT DOCUMENTS 5,701,121 A    12/1997  Murdoch
6,003,777 A *  12/1999  Kowalski ............. G06K 7/0008
                                                  235/439
(Continued)

FOREIGN PATENT DOCUMENTS

WO    WO 2006064480    6/2006

*Primary Examiner* — Alejandro Rivero

(57) ABSTRACT

Communications apparatus has a short range wireless radio frequency communicator (1301a) capable of at least one of seeking to initiate short range communication by transmitting an RF signal and of responding to such initiation so that communication between two short range wireless radio frequency communicators occurs when an antenna of a short range wireless radio frequency communicator seeking to initiate communication by transmitting an RF signal is in range of or comes into range of the antenna of another short range wireless radio frequency communicator responsive to such initiation so that the magnetic field of the RF signal transmitted by the short range wireless radio frequency communicator seeking to initiate communication is inductively coupled to the antenna of the short range wireless radio frequency communicator responsive to such initiation to enable communication of at least one of power and data between the short range wireless radio frequency communicators. The communications apparatus also has a high data rate data communicator (1301b) for communicating directly with another high data rate data communicator to at least one of receive and transmit data when the short range wireless radio frequency communicator (1301a) has communicated with another in-range short range wireless radio frequency communicator.

18 Claims, 17 Drawing Sheets

(51) Int. Cl.
  *H04B 5/02* (2006.01)
  *H04W 88/06* (2009.01)
  *H04B 5/00* (2006.01)
  *H02J 7/00* (2006.01)
  *G06K 19/07* (2006.01)

(52) U.S. Cl.
  CPC .............. *H04B 5/02* (2013.01); *H04W 88/06* (2013.01); *G06K 19/0712* (2013.01); *H02J 7/0027* (2013.01)

(56) References Cited

U.S. PATENT DOCUMENTS

| | | | |
|---|---|---|---|
| 7,155,199 B2 | 12/2006 | Zalewski et al. | |
| 7,233,247 B1* | 6/2007 | Crossno | G06K 7/0008 340/10.1 |
| 7,457,382 B1 | 11/2008 | Jones et al. | |
| 9,301,337 B2 | 3/2016 | Brown et al. | |
| 2002/0069364 A1 | 6/2002 | Dosch | |
| 2003/0114104 A1 | 6/2003 | Want et al. | |
| 2004/0176032 A1 | 9/2004 | Kotola et al. | |
| 2004/0203352 A1 | 10/2004 | Hall et al. | |
| 2004/0203846 A1 | 10/2004 | Caronni et al. | |
| 2004/0255145 A1 | 12/2004 | Chow | |
| 2004/0264441 A1 | 12/2004 | Jalkanen et al. | |
| 2005/0030160 A1 | 2/2005 | Goren et al. | |
| 2005/0099270 A1 | 5/2005 | Diorio et al. | |
| 2005/0127868 A1* | 6/2005 | Calhoon | G06F 1/26 320/108 |
| 2005/0136939 A1 | 6/2005 | Mountain et al. | |
| 2005/0237198 A1 | 10/2005 | Waldner et al. | |
| 2005/0250555 A1 | 11/2005 | Richardson et al. | |
| 2006/0052055 A1 | 3/2006 | Rowse et al. | |
| 2006/0061326 A1* | 3/2006 | Vine | H02J 7/025 320/108 |
| 2006/0068750 A1* | 3/2006 | Burr | H04W 52/0225 455/343.1 |
| 2006/0071925 A1 | 4/2006 | Wykoff et al. | |
| 2006/0179079 A1 | 8/2006 | Kolehmainen | |
| 2006/0195695 A1 | 8/2006 | Keys | |
| 2006/0281435 A1* | 12/2006 | Shearer | G06K 19/0707 455/343.1 |
| 2009/0088077 A1 | 4/2009 | Brown et al. | |
| 2012/0075072 A1* | 3/2012 | Pappu | H04B 5/0037 340/10.1 |

* cited by examiner

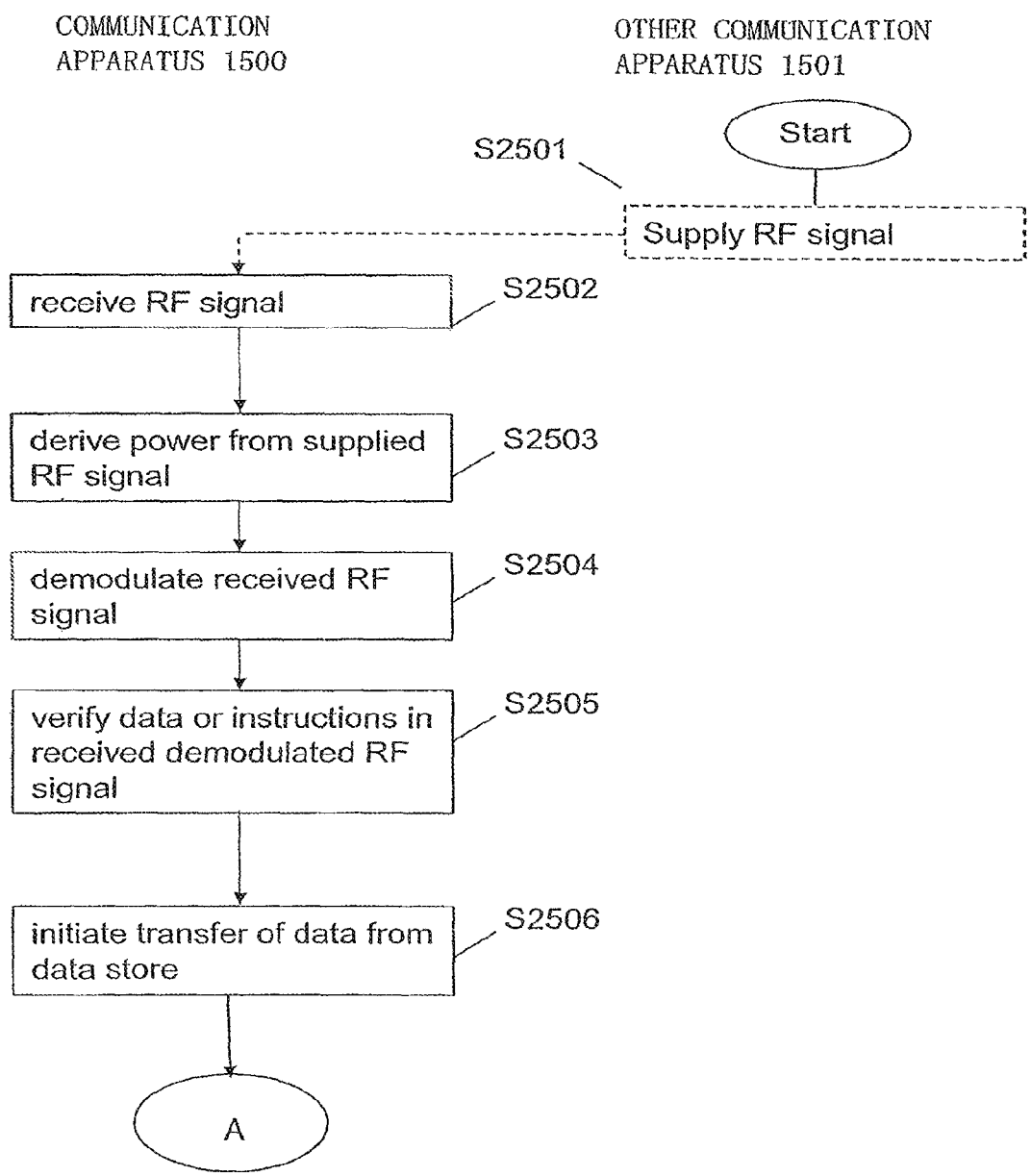

APPARATUS FOR SELECTIVELY COUPLING AN ENERGY STORAGE DEVICE

CROSS REFERENCE TO RELATED APPLICATIONS

The present application is a continuation of U.S. patent application Ser. No. 11/918,173, filed on Oct. 10, 2007, which is a National Stage Entry of PCT/GB2006/001299, filed on Apr. 11, 2006, which claims the benefit of United Kingdom Patent Appl. Nos.: 0507285.5, filed on Apr. 11, 2005, and 0516517.0, filed on Aug. 11, 2005. U.S. patent application Ser. No. 11/918,173 is incorporated herein by reference in its entirety.

FIELD OF THE DISCLOSURE

The invention relates to communications apparatus, in particular communications apparatus that communicates directly with another apparatus and not via a network.

BACKGROUND

Recently there has been rapid progress in the growth and diversity of communication apparatus that communicate directly using a relatively low power radio frequency (RF) communication method such as radio-frequency identification (RFID) or near field communication (NFC) in which communication is achieved via inductive coupling, that is using the H field rather than the E field of a radio frequency signal. Such communications apparatus operate over a relatively short distance range, for example less than 50 centimeters, and therefore need to be in close proximity to one another to communicate. In addition, the rate at which data may be communicated between such communications apparatus can be limited and a limited data rate may restrict the use of such communications apparatus where large amounts of data need to be transferred or where there are time constraints on the transfer of such data.

There are various types of communications apparatus that can transfer data at relatively high data rates by direct communication. For example there are wireless communications apparatus such as wireless ultra wide band communications apparatus (for example communications apparatus operating in accordance with the DS-UWB and MBOA wireless USB standards) and Bluetooth communications apparatus (for example communications apparatus operating in accordance with the IEEE 802.15.1 standard). Other communications apparatus enable transfer of data at a high data rate but require contact or the use of wired or other connections between the communications apparatus. Examples of such contact-based communications apparatus are flash memory cards and USB communications apparatus. The need for contact or connection between the communications apparatus has clear disadvantages for users. In addition such communications apparatus often have a high power demand even on initialisation. Where such communications apparatus are integrated within or used with larger apparatus, such as mobile telephones or portable computers, each device is designed to be compatible with certain selected larger apparatus. There is no one universal size, shape or functionality which fits all larger apparatus or can be used with all larger apparatus.

SUMMARY OF THE INVENTION

In a first aspect of the invention, there is provided a communications apparatus having a short range wireless radio frequency communicator operable to communicate directly, that is not via a network or other intermediary, with another in-range short range wireless radio frequency communicator and a high data rate data communicator operable to communicate data directly with another high data rate data communicator when the short range wireless radio frequency communicator has communicated with another in-range short range wireless radio frequency communicator.

The communication of which the short range wireless radio frequency communicator is capable when in range of another short range wireless radio frequency communicator comprises of at least one of: receiving an RF field from another short range communicator seeking to initiate short range communication, receiving data from a modulated RF field provided by the other short range wireless radio frequency communicator; supplying data to the other short range wireless radio frequency communicator by modulating an RF field; seeking to initiate short range communication by supplying an RF field; deriving a power supply from an RF field provided by the other short range wireless radio frequency communicator; and seeking to initiate short range communication by providing an RF field from which the other short range wireless radio frequency communicator can derive a power supply. Such short range communication is by inductive coupling, that is using the H field.

The high data rate communicator is capable of at least one of receiving data from another high data rate communicator and supplying data to another high data rate communicator.

As used herein the term "short range" means that short range wireless radio frequency communicators can communicate when they are within a predetermined distance or range less than 1 meter, for example less than 20 centimeters. As used herein the term "high data rate" means that the high data rate communicator is capable of communicating data at a data rate of the order of 100 Mega bits per second (Mbps), preferably 500 Mbps or above.

In an embodiment, the short range wireless radio frequency communicator and high data rate data communicator are provided within the same device which may be stand-alone, comprised within, or integral or integratable within or attachable to a larger device or form part of a larger system.

In an embodiment, the short range wireless radio frequency communicator is configured to cause or bring about initialisation of communications via the high data rate data communicator. Such initialisation may be direct or indirect. For example initialisation may occur through a host processor separate from the apparatus or may be through a processor within the apparatus, a short range wireless radio frequency communicator of such apparatus or a high data rate data communicator of such apparatus.

In an embodiment, a short range wireless radio frequency communicator may be provided within a personal computer or hand-held electrical device (such as a mobile telephone or PDA).

In an embodiment, the high data rate communicator may derive a power supply from the short range wireless radio frequency communicator so that it is not necessary for the high data rate communicator to have its own power supply. In such circumstances, where the short range wireless radio frequency communicator is capable of deriving a power supply from an RF field provided by another in-range short range wireless radio frequency communicator, then the communications apparatus need not have its own power supply but may derive a power supply only when in range of another short range wireless radio frequency communicator so that the high data rate communicator is only powered for data communication, thereby enabling power saving. Where the communications apparatus comprises part of or is associated with a larger device (such as a personal computer, laptop, a mobile telephone or PDA) this avoids the communications apparatus necessarily having to use the power supply of that larger device which may be particularly advantageous where the larger device is a battery-powered device such as a mobile telephone, laptop or PDA.

In an embodiment, an initialisation procedure (such as at least one of a communications apparatus recognition process, a verification, validation or authorisation process for data communication) may be carried out before data communication. The initialisation procedure may be initiated or conducted by the short range wireless radio frequency communicator so that power need only be supplied to the high data rate communicator when it is actually communicating data.

In an embodiment, the high data rate communicator may be an RF wireless communicator capable of communicating over a longer distance range than the short range wireless radio frequency communicator so that it may be possible (where a power supply for the high data rate communicator can be maintained once the short range wireless radio frequency communicators are out of range of one another) for one short range wireless radio frequency communicator to be moved out of range of the other short range wireless radio frequency communicator once the short range wireless radio frequency communicators have communicated and data communication between the high data rate data communicators has been initiated, so that a user may move or walk away once data communication between the high data rate data communicators has been initiated.

In embodiments where the short range wireless radio frequency communicator derives a power supply from another short range wireless radio frequency communicator, the derived power supply may be used for all or parts of the functionality of the short range wireless radio frequency communicator, and/or all or parts of the functionality of the high data rate data communicator. For example, this derived power supply may be used to power the short range wireless radio frequency communicator during an initialisation procedure which may involve at least one of recognition of the communications apparatus and verification, validation and/or authorisation for a data transfer involving the high rate data communicator and/or may be used to power the high data rate data communicator during data transfer involving the high rate data communicator.

In an embodiment where the short range wireless radio frequency communicator derives a power supply from another short range wireless radio frequency communicator, initialisation of data communication involving the high data rate data communicator may be started only when the short range wireless radio frequency communicator derives power from another short range wireless radio frequency communicator (which may be stand-alone or comprised within a larger device and/or host device/system). Additionally or alternatively, initialisation of data communication involving the high data rate data communicator may be started only when the short range wireless radio frequency communicator receives at least one of an RF signal and a modulated RF signal from another short range wireless radio frequency communicator (which may be stand-alone or comprised within a larger device and/or host device/system).

Alternatively or additionally, the communications apparatus may have a power supply in the form of one or more power supply or energy storage devices such as for example: batteries, capacitors, solar cells, electromechanical generators, acoustic transducers, and fuel cells. Such power supply devices may be provided within a larger device or host device/system. A switch may be provided to couple the power supply from the larger device or host device/system functionality to the communications apparatus. The power supply may be chargeable or re-chargeable. Charging may occur through use of the short range wireless radio frequency communicator (for example when the short range wireless radio frequency communicator is not initialising data transfer or involved in data communication) or through another mechanism, for example a USB link, inductive coupling, far field coupling, a solar cell, an electromechanical generator, an acoustic transducer, a 50/60 Hz mains hum energy harvester, and a fuel cell recharger.

In an embodiment, the communications apparatus has or is associated with a display. As another possibility, the display may comprise the communications apparatus. Preferably the display is a bistable display. The display may provide, for example: an advertising poster or other advertising media; a programmable post-it note; a key-fob; an electronic wallet; a CD casing; fridge magnet.

In an embodiment, a power supply derived from another short range wireless radio frequency communicator may be coupled to the high data rate communicator by a switch.

In an embodiment, a power supply device may be coupled to at least one of the short range wireless radio frequency communicator and the high data rate communicator by a switch.

In an embodiment, a further data communicator may be provided. Such further data communicator may, for example, use a mobile telecommunications network, a 3G network, and/or UHF communications.

In an embodiment, the high data rate communicator may effect data communication only once a further procedure has occurred utilising the further data communicator or once further data or authorisation has been obtained from the further data communicator.

In another aspect, a communications apparatus is provided in which power for data communication by a high data rate communicator or initiation of data communication by the high data rate communicator is provided via short range radio frequency.

In an embodiment, the communications apparatus is a standalone apparatus.

In an embodiment, the standalone apparatus may be arranged to receive an electronic token which may communicate with the communications apparatus or transfer data to and/or from the communications apparatus by a contact or contactless method to enable, for example, validation of payment or payment for data communication. In an embodiment the electronic token is a secure banking token conforming to the international standard ISO 7816.

In an embodiment, there is provided a memory card comprising communications apparatus embodying the invention. Such a memory card has the advantages that it can be used with any device that can communicate with it and that it does not need to couple mechanically to another device in order for data to be transferred to and/or from the memory card for example, so that unlike conventional memory cards, a memory card comprising communications apparatus embodying the invention does not need to be sized and/or shaped so as to fit with or into a larger device so allowing a single size and shape memory card to be used with different larger devices In an embodiment, the short range wireless radio frequency communicator has a first antenna and the high data rate data communicator has a second antenna.

In an embodiment, the short range wireless radio frequency communicator and high data rate data communicator share an antenna. The antenna may be configured to operate at a plurality of frequencies.

In an embodiment, when a short range wireless radio frequency communicator seeking to initiate short range communication or responsive to another short range wireless radio frequency communicator seeking to initiate short range communication is in range of another short range wireless radio frequency communicator and has established short range communication, then the short range wireless radio frequency communicator is configured to carry out an initialisation procedure which comprises at least one of a recognition process for enabling determination of the type and compatibility of the other short range wireless radio frequency communicator and a validation, authorisation and/or verification process for determining whether or not data communication with a second high data rate communicator is allowed or authorised prior to data communication by the high data rate data communicator. As another possibility, the high data rate data communicator may be configured to carry out validation, authorisation and/or verification prior to data communication by the high data rate data communicator. Recognition, authorisation, validation or verification may be effected by the supplier and/or the receiver of data. Validation, authorisation, or verification may, for example, include verification of a password, passcode or identification and/or payment confirmation. Validation and/or verification may occur directly between the communications apparatus and a data supplier which may be another short range wireless radio frequency communicator or other data supplier. As another possibility, validation and/or verification may be an independent procedure. Thus, for example, where the communications apparatus is associated with or incorporated in another device (such as a mobile telephone, PDA or laptop) capable of communicating over a network such as a telecommunications network or the Internet or an intranet, then a user may conduct a verification, authorisation and/or validation procedure with a verification, authorisation and/or validation entity over the network to obtain verification, authorisation and/or validation data which may be supplied directly by the other device to the communications apparatus or may be output to the user (for example an authorisation code or key may be displayed on a display of the other device) so that the user may then input the authorisation code or key to the communications apparatus via a user interface of the communications apparatus or a larger device comprising the communications apparatus.

In an embodiment, the short range wireless radio frequency communicator and high data rate data communicator are separable and communication between the separable parts may be contactless (for example via RF signals), contact based or wire based. For example, the short range wireless radio frequency communicator may be within a mobile telephone whilst the high data rate data communicator may be within a flash memory card or other card which can be slotted into the mobile telephone or held within the proximity of the mobile telephone when high speed data transfer is required.

BRIEF DESCRIPTION OF THE DRAWINGS/FIGURES

Embodiments of the present invention will now be described, by way of example, with reference to the accompanying drawings, in which.

Figure 3:
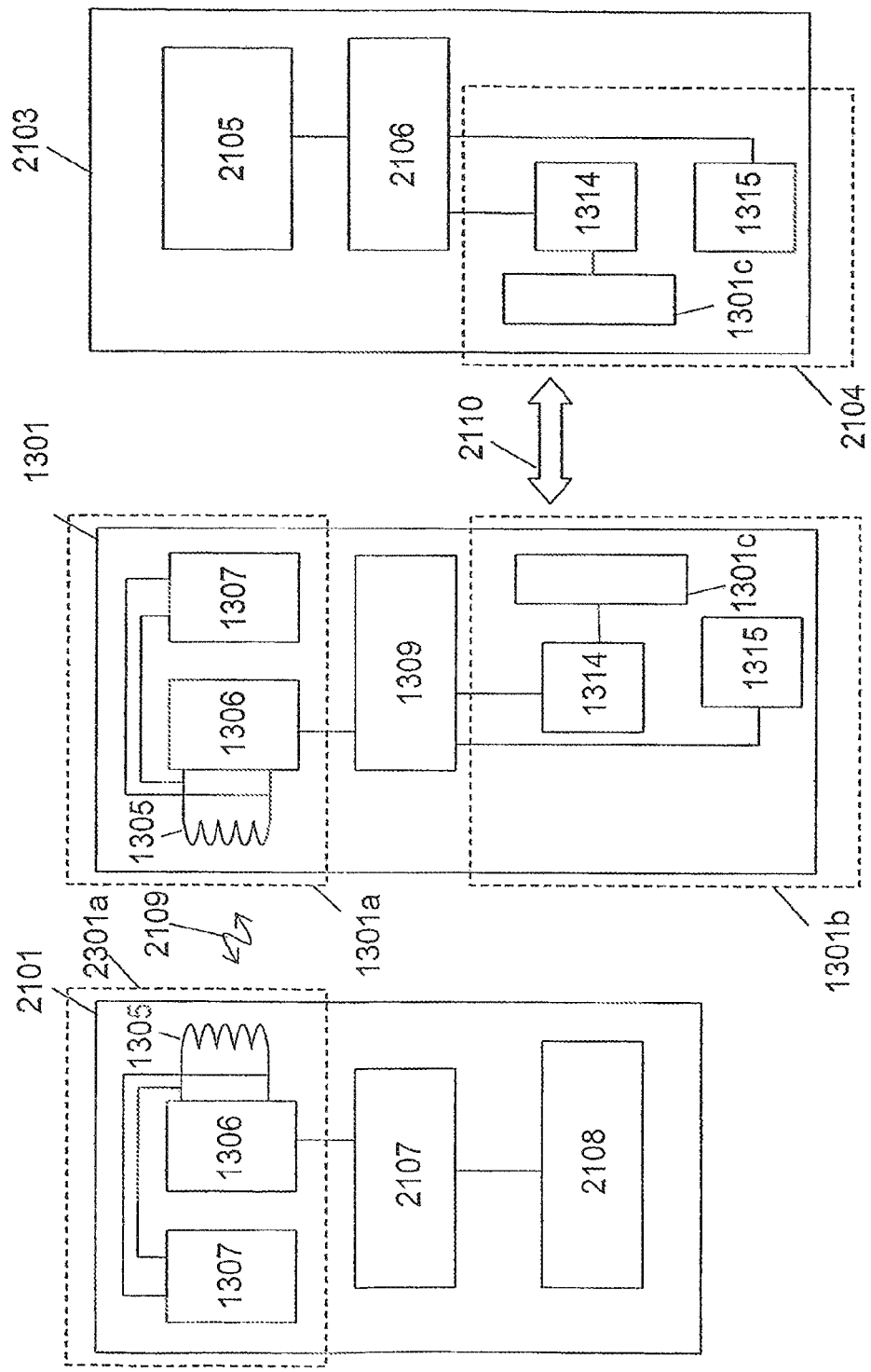
Figure 4:
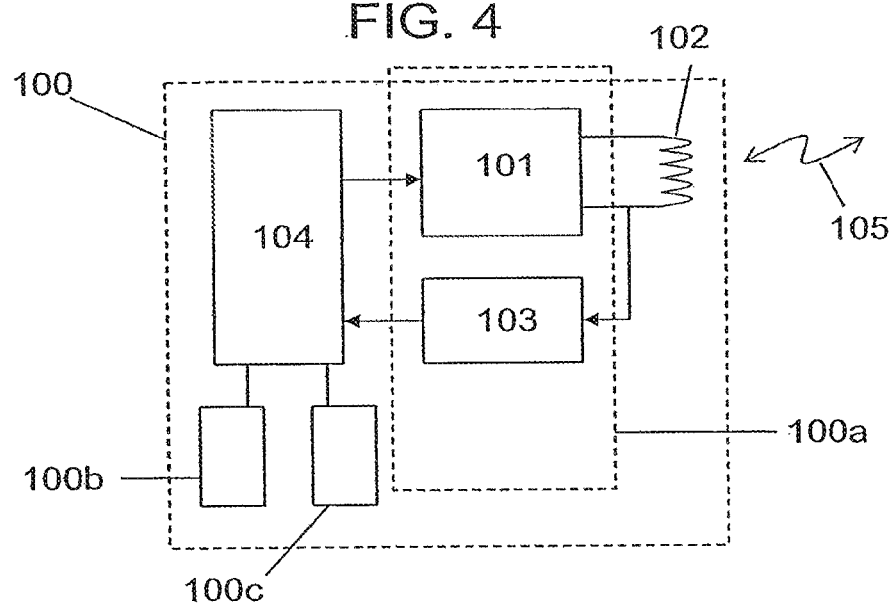
Figure 5:
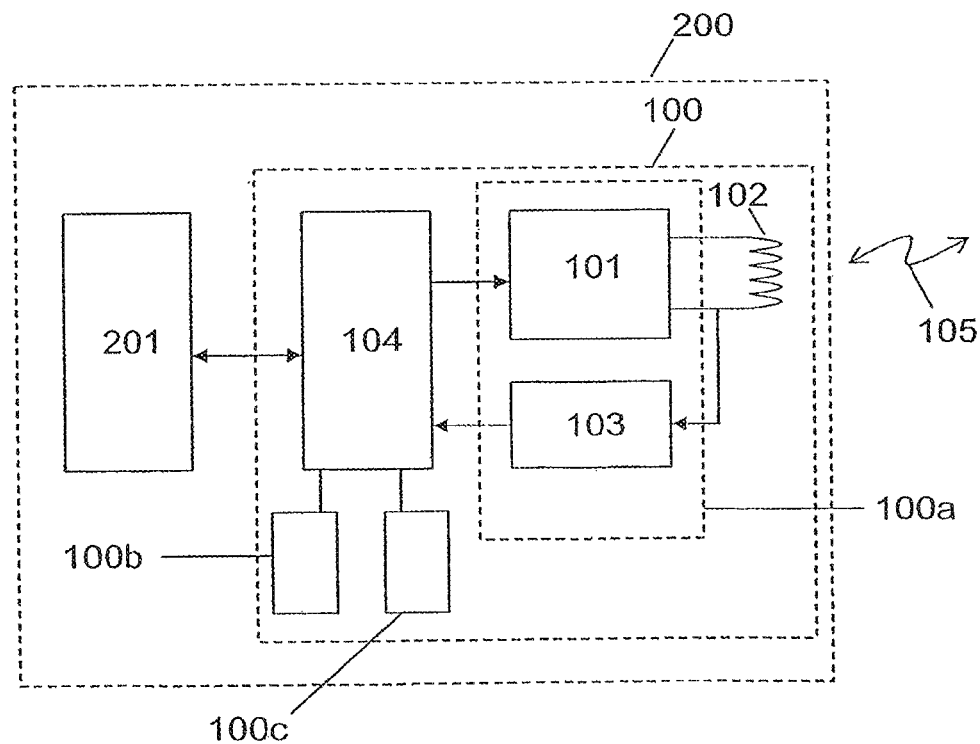
Figure 6:
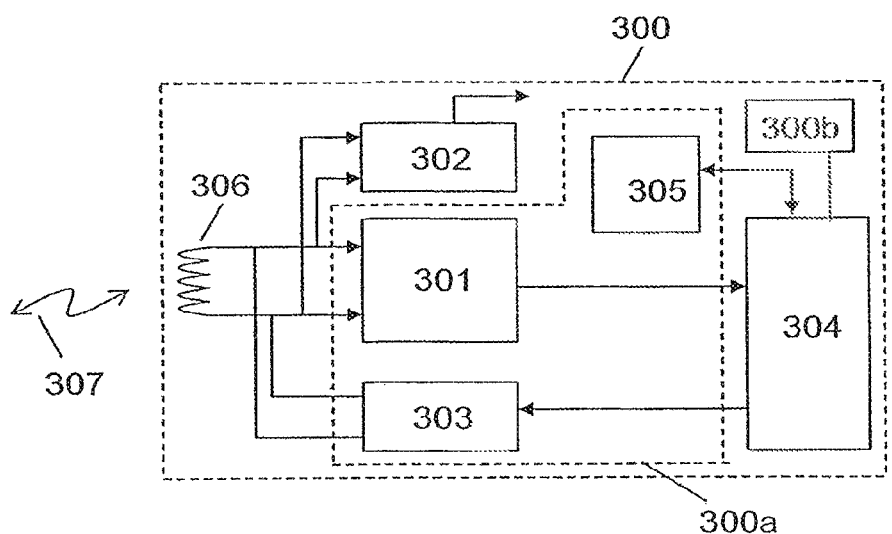
Figure 7:
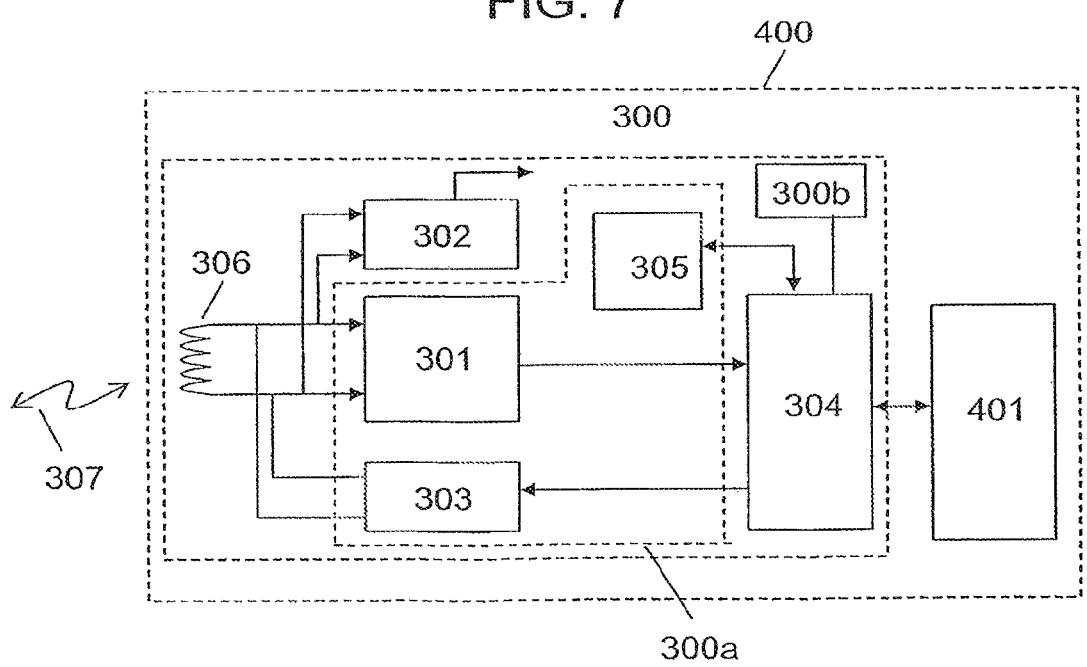
Figure 8:
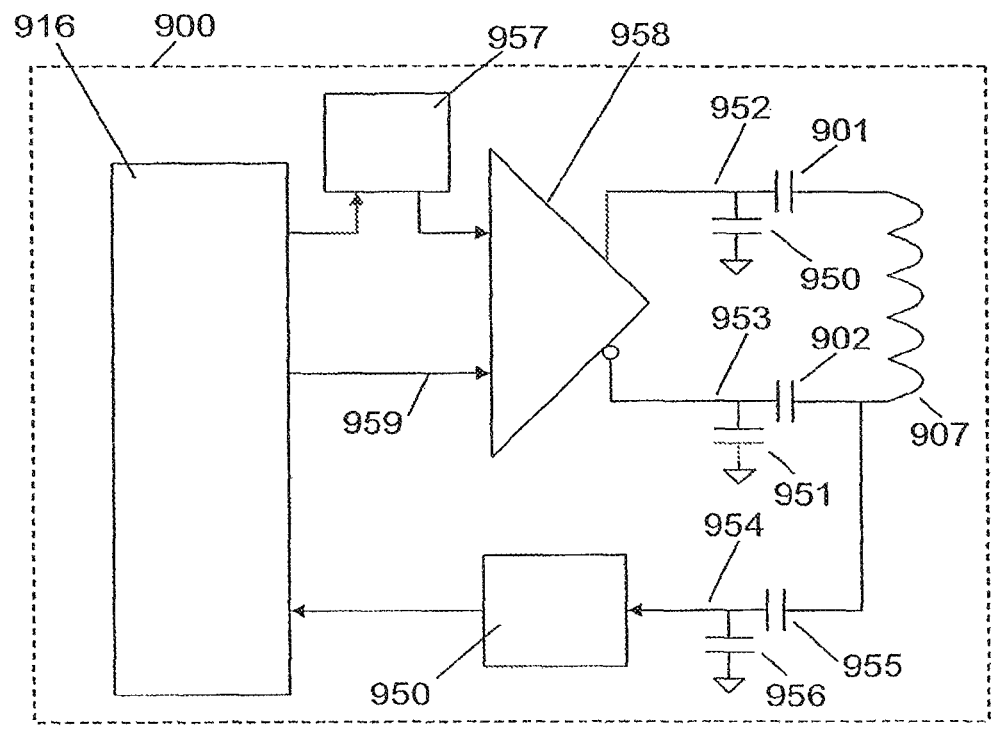
Figure 9:
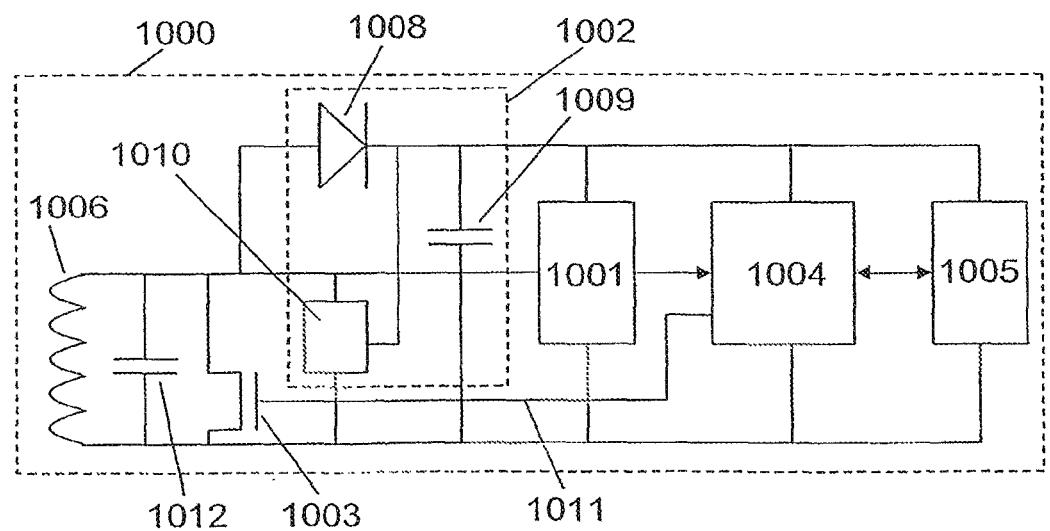
Figure 10:
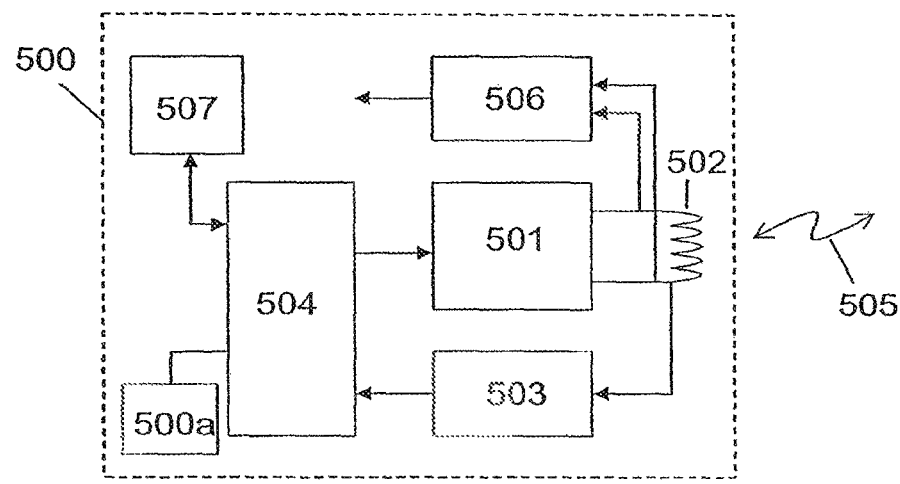
Figure 11:
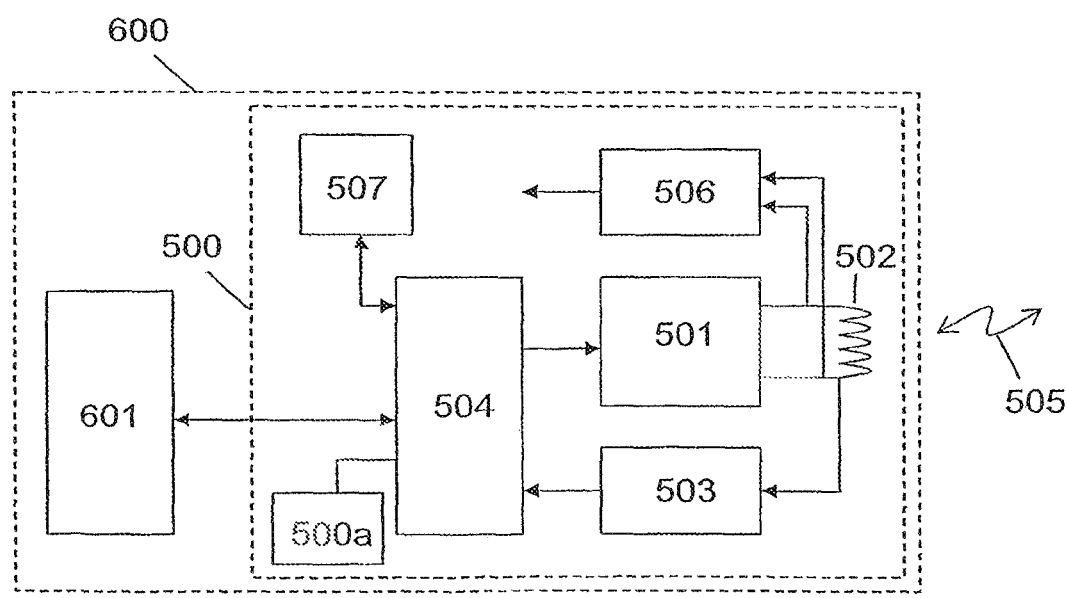
Figure 12:
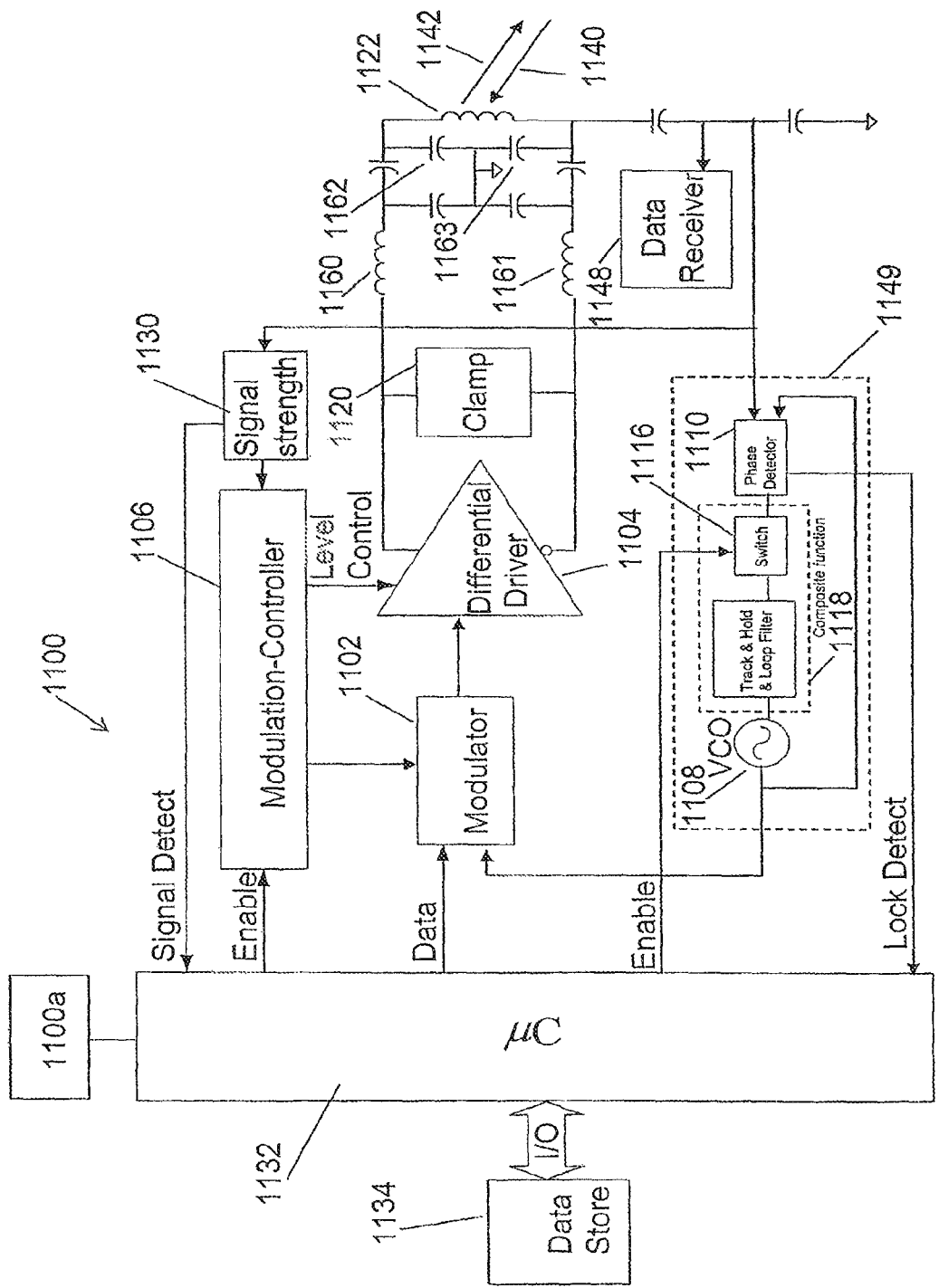
Figure 13:
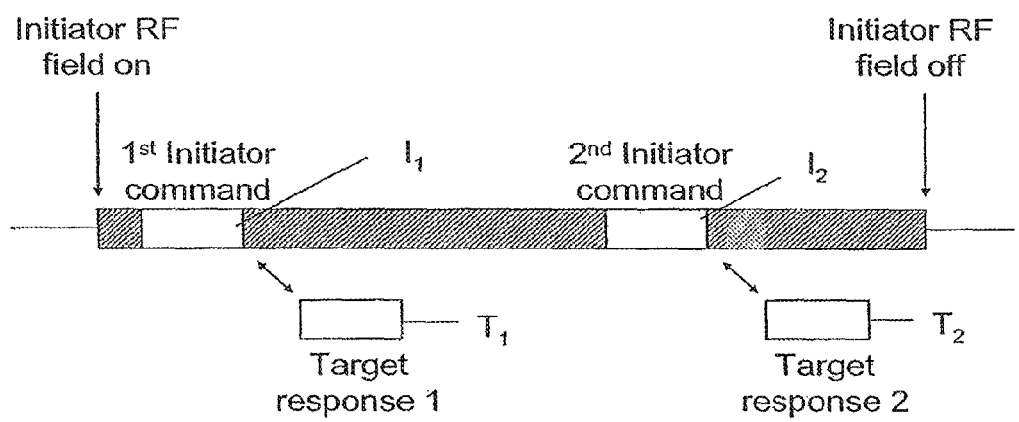
Figure 14:
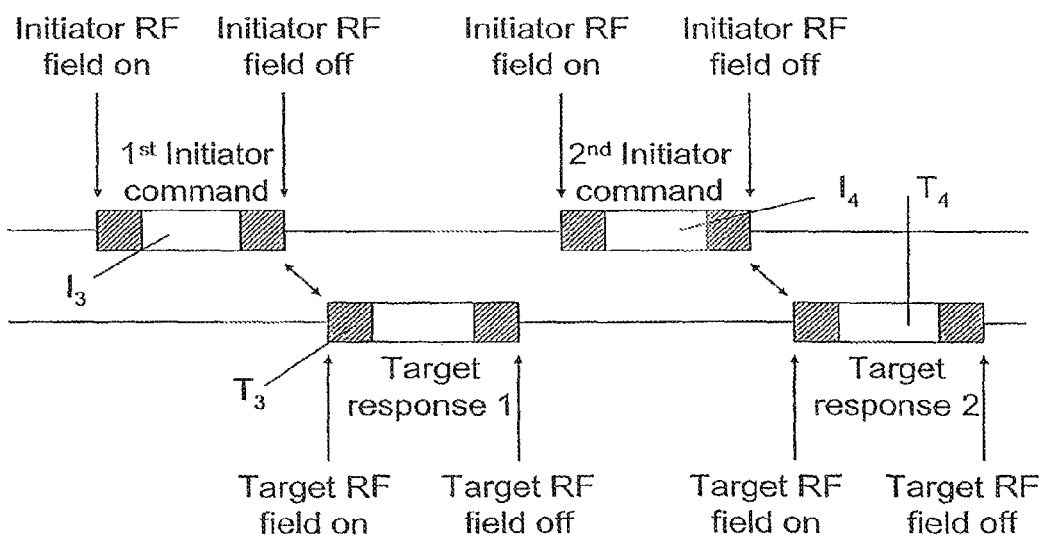
Figure 15B:
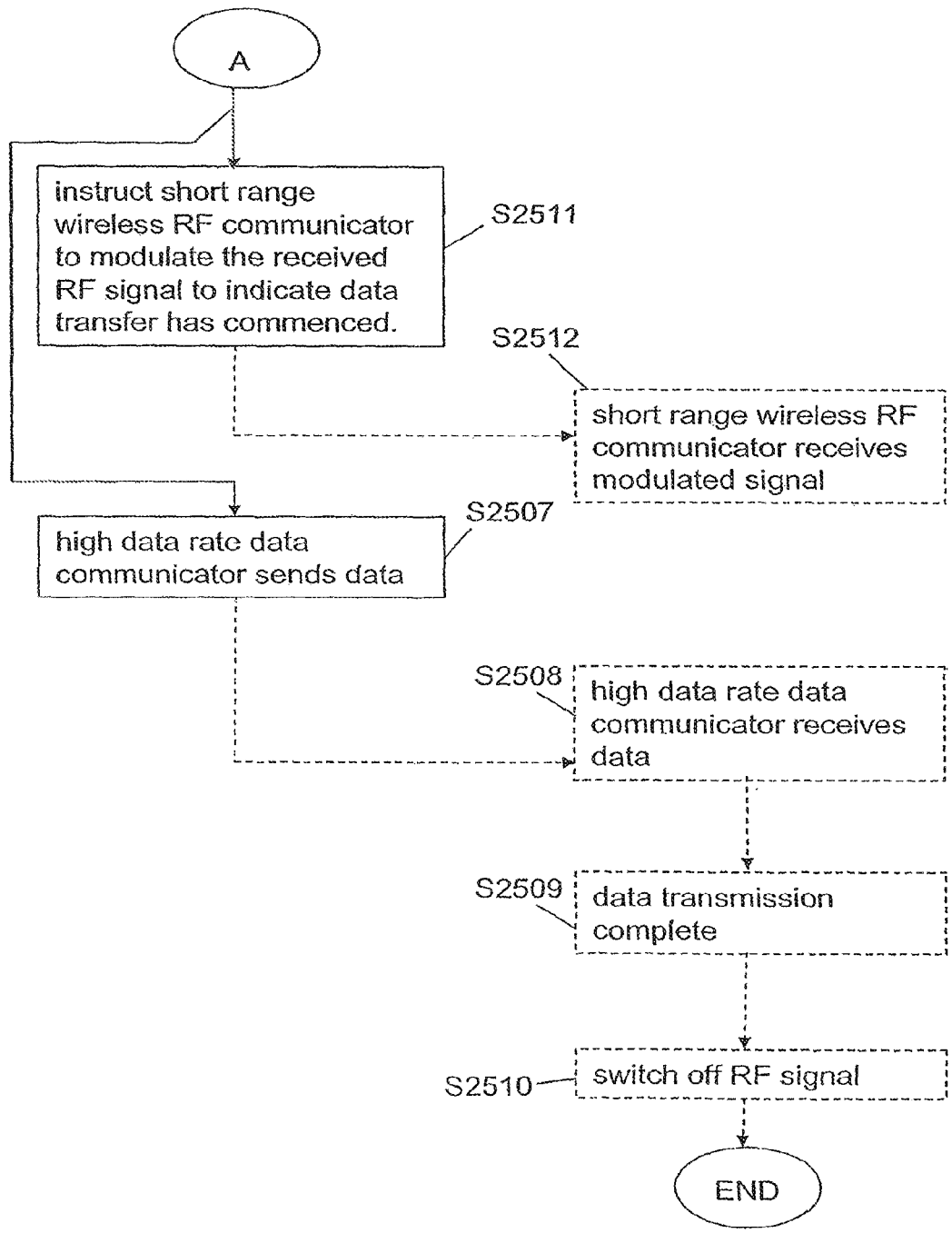
Figure 16:
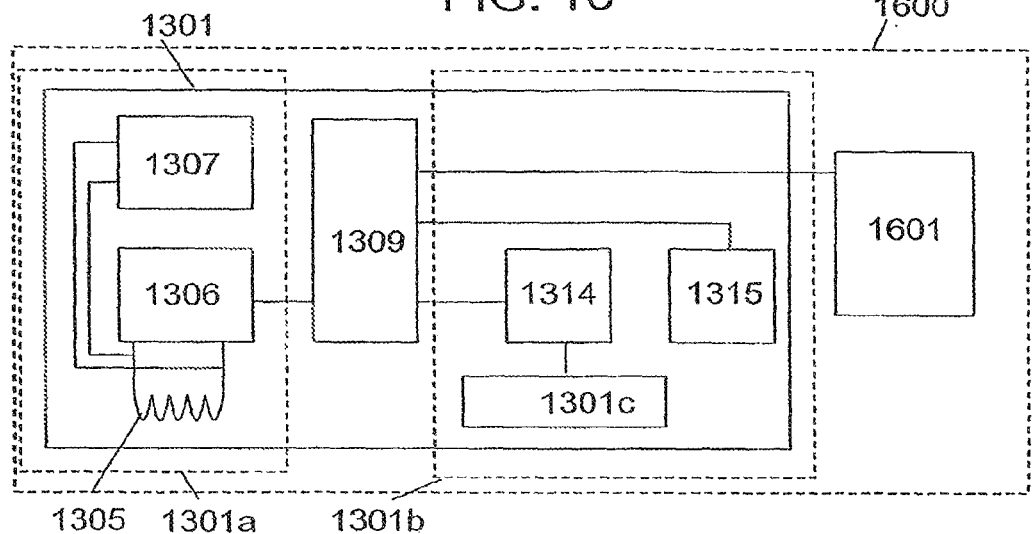
Figure 17:
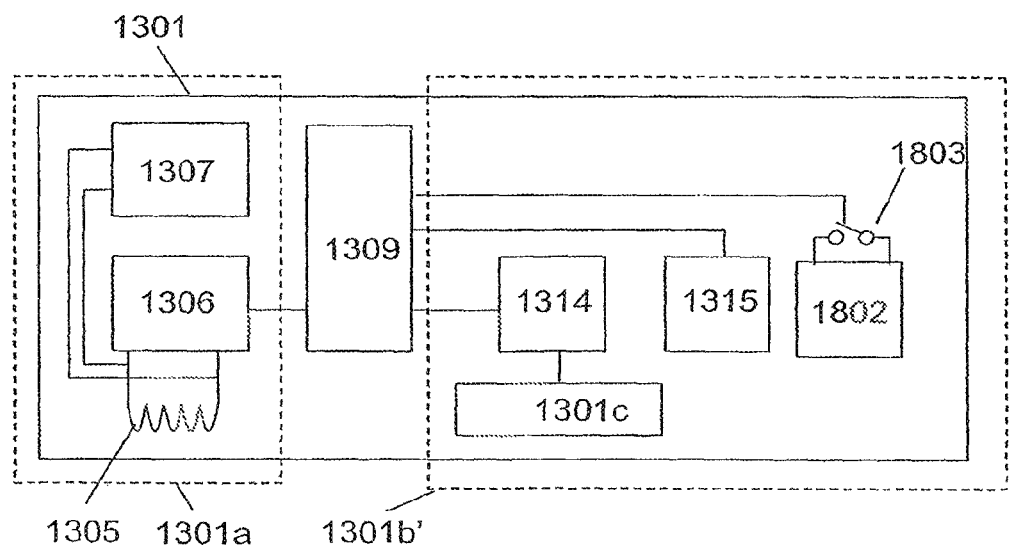
Figure 18:
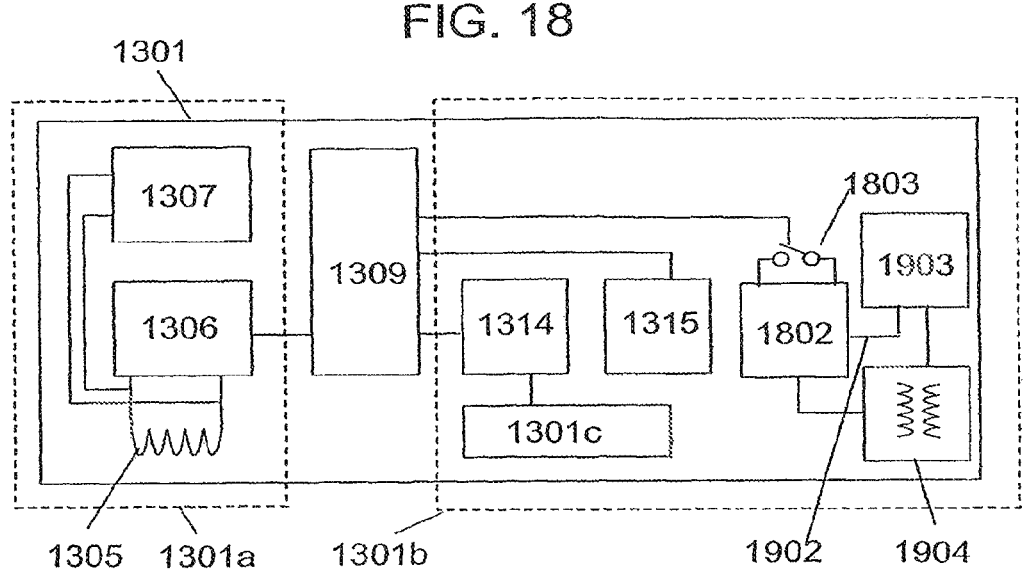
Figure 19:
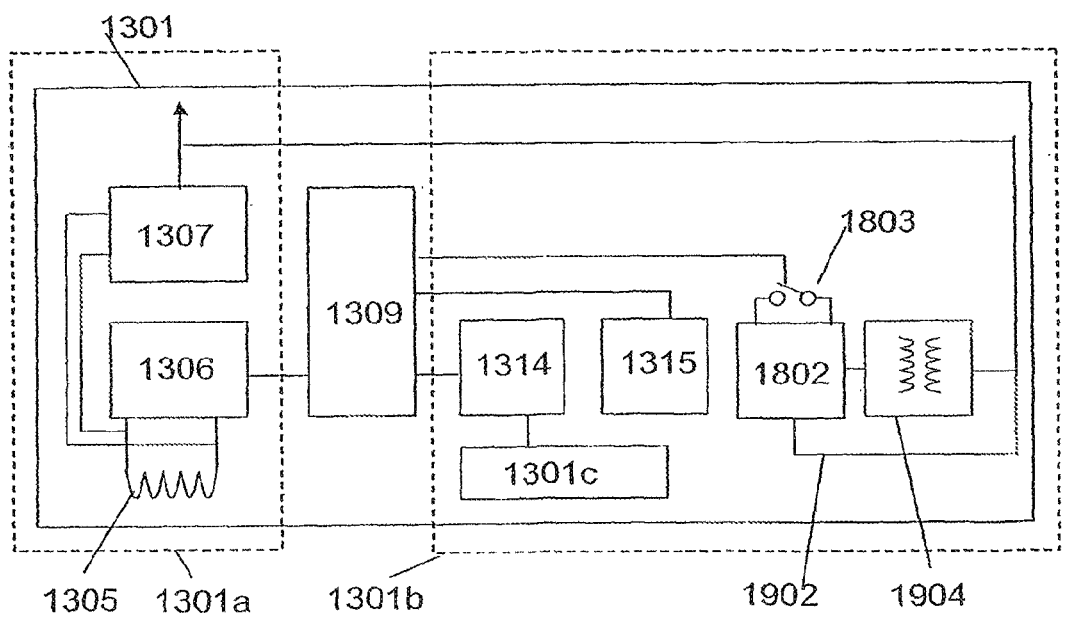
Figure 20:
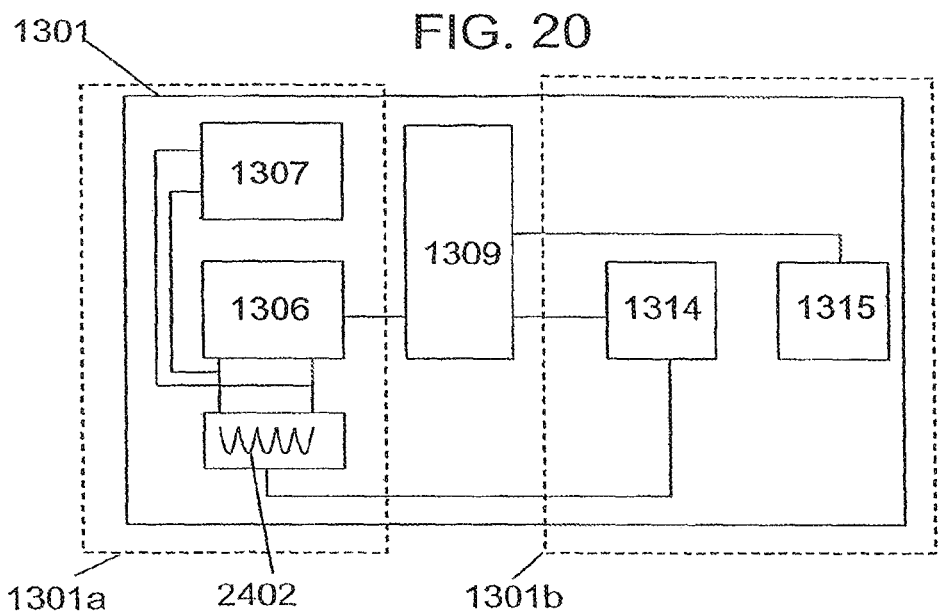
Figure 21:
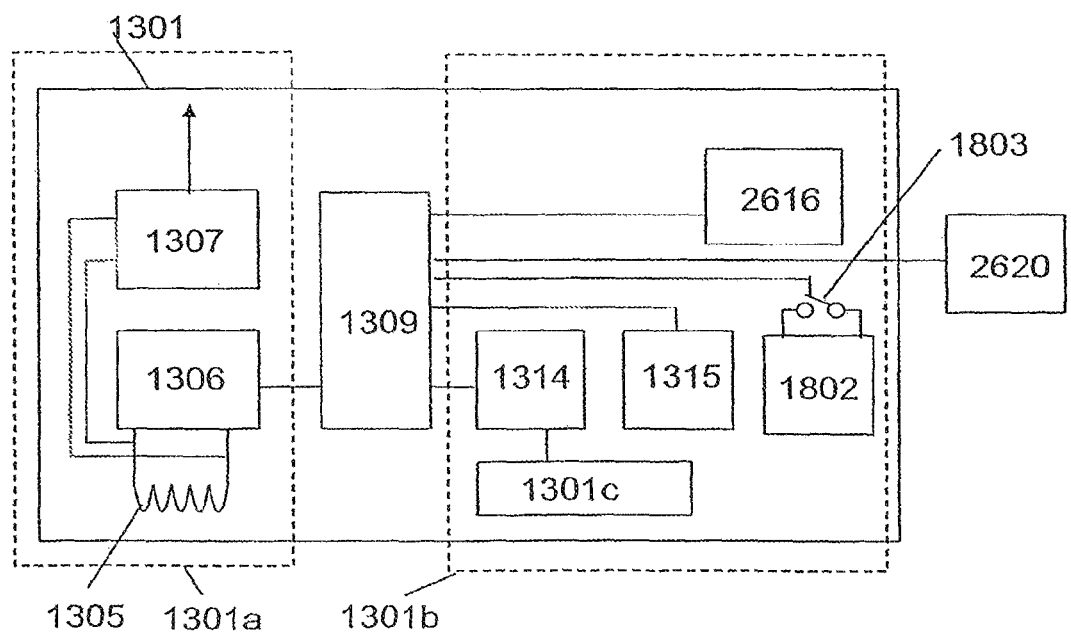
Figure 22:
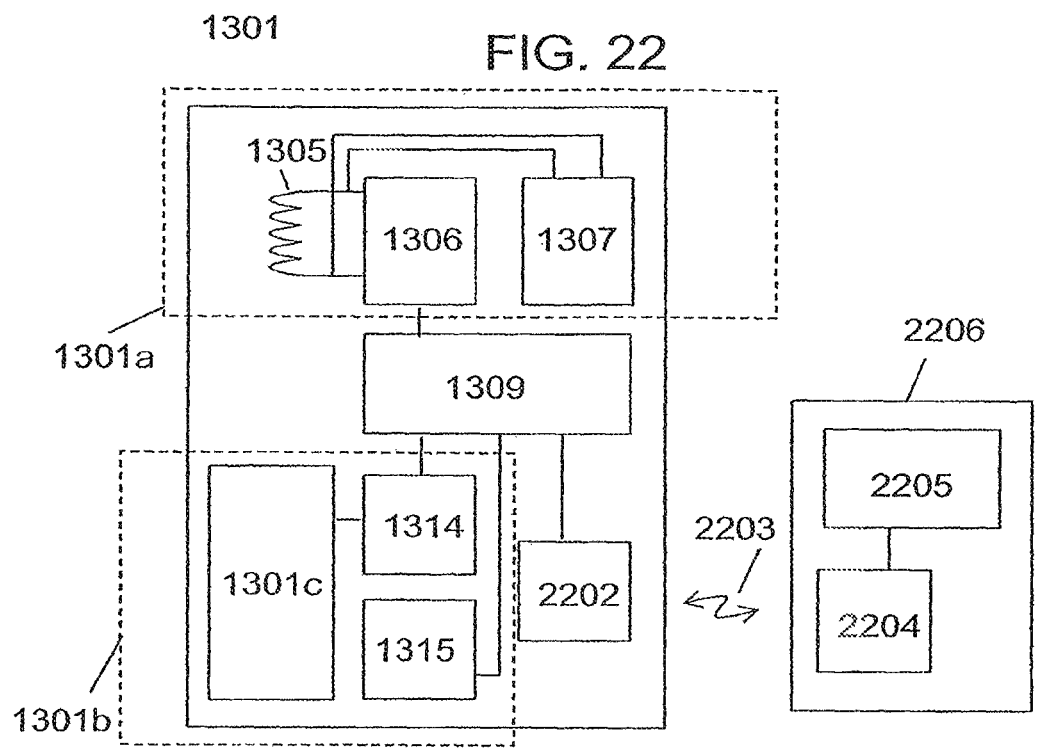
Figure 23:
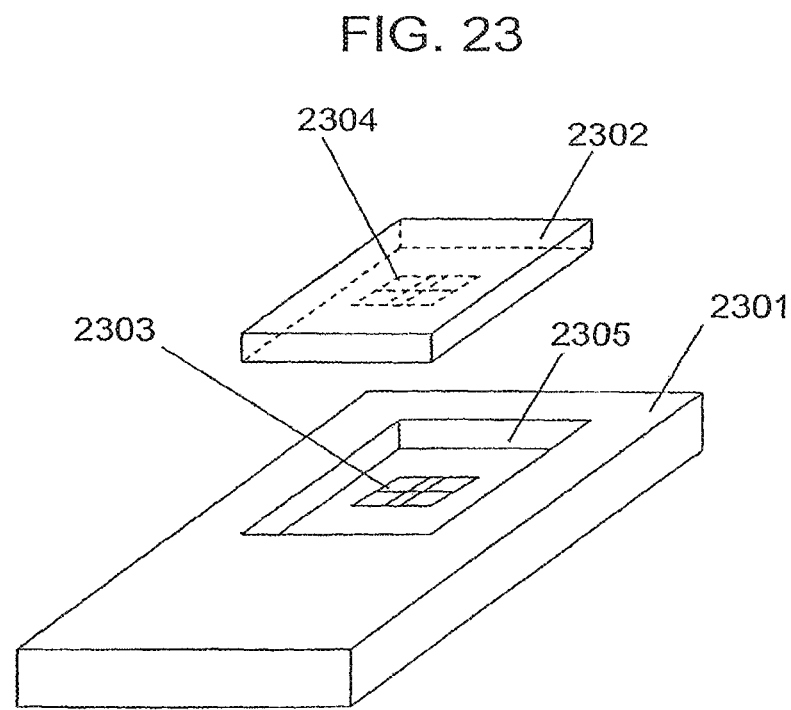

FIG. 3 shows a functional block diagram illustrating short range wireless radio frequency communication between a short range wireless radio frequency communicator of a communications apparatus embodying the invention and another short range wireless radio frequency communications apparatus and high data speed data communication between a high data rate data communicator of the communications apparatus embodying the invention and another high data speed communications apparatus;

FIG. 4 shows a functional block diagram of an RFID reader that may provide the short range wireless radio frequency communicator of communications apparatus embodying invention;

FIG. 5 shows a functional block diagram of a system incorporating an RFID reader that may provide the short range wireless radio frequency communicator of communications apparatus embodying invention;

FIG. 6 shows a functional block diagram of an RFID data storage device or tag that may provide the short range wireless radio frequency communicator of communications apparatus embodying invention;

FIG. 7 shows a functional block diagram of a system incorporating an RFID data storage device or tag that may provide the short range wireless radio frequency communicator of communications apparatus embodying invention;

FIG. 8 shows a more detailed functional block diagram of one example of the RFID reader shown in FIGS. 4 and 5;

FIG. 9 shows a more detailed functional block diagram of one example of the RFID tag shown in FIGS. 6 and 7;

FIG. 10 shows a functional block diagram of an NFC communicator that may provide the short range wireless radio frequency communicator of communications apparatus embodying invention;

FIG. 11 shows a functional block diagram of a system incorporating an NFC communicator that may provide the short range wireless radio frequency communicator of communications apparatus embodying invention;

FIG. 12 shows a more detailed functional block diagram of one example of the NFC communicator shown in FIGS. 10 and 11;

FIG. 13 shows a diagram for explaining passive NFC communication;

FIG. 14 shows a diagram for explaining active NFC communication;

FIGS. 15a and 15b show a flow chart for illustrating operation of a communications apparatus embodying the invention;

FIG. 16 shows a functional block diagram illustrating another embodiment of communications apparatus in accordance with the present invention where the communications apparatus has a bistable display;

FIG. 17 shows a functional block diagram illustrating another embodiment of communications apparatus in accordance with the present invention where the high data rate data communicator of the communications apparatus has a power supply;

FIG. 18 shows a functional block diagram illustrating another embodiment of communications apparatus in accordance with the present invention where the high data rate data communicator of the communications apparatus has a rechargeable power supply;

FIG. 19 shows a functional block diagram illustrating another embodiment of communications apparatus in accordance with the present invention where the high data rate data communicator of the communications apparatus has a rechargeable power supply that is rechargeable via a power provider of the short range wireless radio frequency communicator of the communications apparatus;

FIG. 20 shows a functional block diagram illustrating another embodiment of communications apparatus in accordance with the present invention wherein the short range wireless radio frequency communicator and the high data rate data communicator share an antenna;

FIG. 21 shows a functional block diagram illustrating another embodiment of communications apparatus in accordance with the present invention;

FIG. 22 shows a functional block diagram illustrating another embodiment of communications apparatus in accordance with the present invention where the communications apparatus has an additional power and/or data provider;

FIG. 23 shows a simplified perspective view to illustrate one way in which the communications apparatus embodying the invention may physically interact with an additional power and/or data provider; and FIGS. 24 to 29 show diagrams for illustrating various applications for communications apparatus embodying the invention.

DETAILED DESCRIPTION

Figure 1:
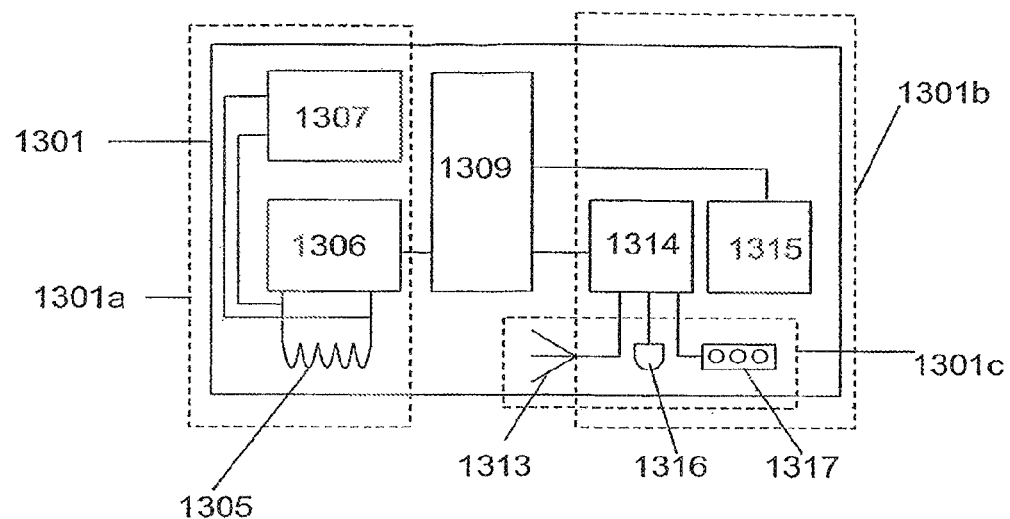
FIG. 1 shows a functional block diagram of a first embodiment of communications apparatus in accordance with the present invention that has both a short range wireless radio frequency communicator such as a radio-frequency identification (RFID) or a near field communication (NFC) communicator, and a high data rate data communicator.

Referring now to the drawings, FIG. 1 shows a functional block diagram of a first embodiment of communications apparatus 1301 in accordance with the present invention having a short range wireless radio frequency communicator 1301a that enables wireless communication of at least one of power and data when two such short range wireless radio frequency communicators are in range of one another, a high data rate data communicator 1301b for enabling communication with another such high data rate data communicator at a data rate that is generally higher that that achievable by the short range wireless radio frequency communicators once at least one of one of power and data have been communicated by the short range wireless radio frequency communicators, and a controller 1309 for controlling operation of the communications apparatus.

As used herein the term radio frequency means a frequency or frequencies in the range 10 kilo Hertz to 300000 Mega Hertz.

The short range wireless radio frequency communicator 1301a is configured to seek to initiate short range communication and/or to respond to another short range wireless radio frequency communicator seeking to initiate short range communication. The short range wireless radio frequency communicator 1301a is configured to at least one of transmit and receive at least one of power and data (where data may include RF signals, control signals or instructions) using a radio frequency field while the high data rate data communicator 1301b is configured to be capable of at least one of supplying and receiving data at high rate and may be a wireless or contact based high data rate data communicator.

The short range wireless radio frequency communicator 1301a comprises an antenna 1305, a signal communicator 1306 and a power provider 1307 which may supply power to all or part of the communications apparatus 1301 with, in the latter case, other parts of the communications apparatus having a separate power supply (not shown). For simplicity, not all of the connections to the power provider are shown.

The power provider 1307 may be a power deriver configured to derive a power supply from a signal coupled to the antenna 1305 of the short range wireless radio frequency communicator 1301a. Alternatively or additionally, the power provider 1307 may be a coupling to an external power source (not shown) or may take the form of one or more power supply or energy storage devices such as for example: batteries, capacitors, solar cells, electromechanical generators, acoustic transducers, and fuel cells. The power supply may be chargeable or rechargeable. Charging may occur through use of the communications apparatus (for example when the short range wireless radio frequency communicator is not initialising data transfer or involved in data communication) or through another mechanism, for example a USB link, inductive coupling, far field coupling, a solar cell, an electromechanical generator, an acoustic transducer, a 50/60 Hz mains hum energy harvester, and a fuel cell recharger.

The short range wireless radio frequency communicator communicates by inductive coupling, that is using the H field of a radio frequency signal. Examples of such short range wireless radio frequency communicators are a RFID (Radio Frequency Identification Device) communicator operating under, for example, the international standard ISO/IEC 14443 or ISO/IEC 15693 or an NFC (Near Field Communication) communicator operating under, for example, the international standard ISO/IEC 18092 (NFCIP-1) or ISO/IEC 21481 (NFCIP-2).

Typically, where the short range wireless radio frequency communicator is an RFID and/or NFC communicator, the highest rate at which the short range wireless radio frequency communicator is capable of data communication will lie in the range of from 100 kilo bits per second (1 Kbps) to 1 Mega bit per second (1 Mbps). For example, where the short range wireless radio frequency communicator operates under the NFCIP-1 standard, the highest rate at which the short range wireless radio frequency communicator is capable of data communication will be in the range 108 Kbps (kilo bits per second) to 480 Kbps while where the short range wireless radio frequency communicator operates under the NFCIP-2 standard the highest rate at which the short range wireless radio frequency communicator is capable of data communication may be up to 1 Mbps (Mega bit per second).

The range or distance over which two short range wireless radio frequency communicators may communicate may be up to 1 meter, more usually up to 50 cm (centimeters), and preferably up to 20 cm. The high data rate communicator 1301b is operable to provide a maximum data rate that is of the order of hundreds of Mbps, preferably above about 500 Mbps. The high data rate communicator 1301b comprises a high speed data transceiver 1314 having a high data rate coupler 1301c. As an example, FIG. 1 shows the high data rate coupler 1301c as comprising an antenna 1313 (for example a dipole antenna), an infra red (IR) transceiver 1316 and a contact connector 1317 so that the high data rate transceiver 1314 may operate using a radio frequency (RF) scheme, an infra-red (IR) scheme or a contact-based scheme, respectively. Preferably, the high data rate data communicator uses a low power radio frequency (RF) communications scheme that operates over a longer distance than RFID or NFC so that (where the communications apparatus has a power supply or can maintain sufficient power for the duration of the data communication) a communications apparatus can be moved away once high data rate communication has been initiated. However, it will be appreciated that one or any combination of the above high speed data communications schemes or technologies may be used.

Examples of high data rate RF technologies that can operate over distances of up to about 10 meters include wireless ultra wide band technology (UWB) such as the DS-UWB wireless USB standard which currently provides for a data rate transfer in the range of 28 to 1320 Mbps (Mega bits per second) to 1 Gbps (Gigabit per second) or the MBOA wireless USB standard which currently provides dates rates of 55, 80, 110, 160, 200, 320 and 480 Mbps and so at present has a maximum data rate transfer of 480 Mbps (Mega bits per second). It may also be possible to use Bluetooth RF communication technology (which currently operates at rates of 1-3 Mbps as specified under IEEE 802.15.1) particularly where data rates exceeding 3 Mbps are achievable. High data rate transmission may also be achievable by use of data compression techniques. Other examples of high data rate IR technologies include those conforming to standards set by the Infrared Data Association (IrDA). Examples of contact-based technologies include USB and flash memory card technology, for example secure digital (SD) and compact flash (CF) cards. As another example, the wired or wireless high-speed data method xMax developed by xG Technology which uses a modulation method that sends a clock/synchronization signal via a single carrier (at a fairly high level/strength) and then sends data on nearby frequencies, but at very low levels (below noise floor of conventional receivers), may be used. Persons skilled in the art will know that these schemes or technologies are examples only and that the high data rate transceiver 1314 may operate using any appropriate high speed data communications scheme or technology.

The communications apparatus has or has access to at least one data store. In the example shown, the high data rate communicator 1301b includes a data store 1315. The data store may however be in the short range wireless radio frequency communicator or may be provided in an external memory device or by a larger device or system or may consist of any combination of these data storage facilities. The data store may comprise, for example, electrically erasable programmable read only memory (EEPROM) memory which may be of the type known as flash memory or may consist of one time programmable (OTP) memory or any other suitable form of non-volatile or (where a battery is available) battery-backed up memory.

The controller 1309 may be any form of controller suitable for controlling operation of the communications apparatus, for example a state machine, a microcontroller, a microprocessor or a RISC processor. The controller 1309 is configured such that the high data rate communicator 1301c cannot communicate data before coupling of a radio frequency field between the short range wireless radio frequency communicator 1301a and another short range wireless radio frequency communicator has occurred.

FIG. 1 and subsequent Figures show a single controller 1309. It will however be appreciated that the controller 1309 may comprise a separate short range wireless radio frequency communications controller for controlling the functionality of the short range wireless radio frequency communicator 1301a and a separate high data rate controller for controlling the functionality of the high data rate data communicator. In such a case, interaction between the short range wireless radio frequency communications controller and the high data rate controller may then be through an interface, a further controller or one of the short range wireless radio frequency communications controller and the high data rate controller may be controlled directly by the other. The controller 1309 may or may not connect to further functionality (not shown) within the communications apparatus or within a larger apparatus, device or system incorporating the communications apparatus.

The communications apparatus 1301 may be a standalone apparatus or may form a discrete unit or entity within a larger device, apparatus or system or may be provided by functionality provided within, for example distributed within, such a larger device, apparatus or system. The nature of the larger device or system will depend upon the particular application for the communications apparatus (and possibly also whether it is supplying or receiving data). Examples of larger devices or systems include mobile devices that is devices that are easily carried by hand or on the person. Examples of mobile devices are portable computing devices (such as Personal Digital Assistants (PDAs), laptops and tablet PCs), digital cameras, digital camcorders, portable DVD recorders and mobile communications devices including mobile telephones (cellphones) and communications-enabled portable computing devices. Examples of non-mobile devices are personal computers, other consumer items or products, vending machines, other items of electrical or electronic equipment. Communications apparatus embodying the invention may be incorporated in or carried by larger devices or systems with which the communications apparatus does not interact in terms of affecting the function of the device or system, for example communications apparatus embodying the invention may be incorporated in or carried by posters, advertising hoardings, surfaces such as walls or doors, consumer products, product packaging, items of furniture such as desks or the like and so on.

Figure 2:
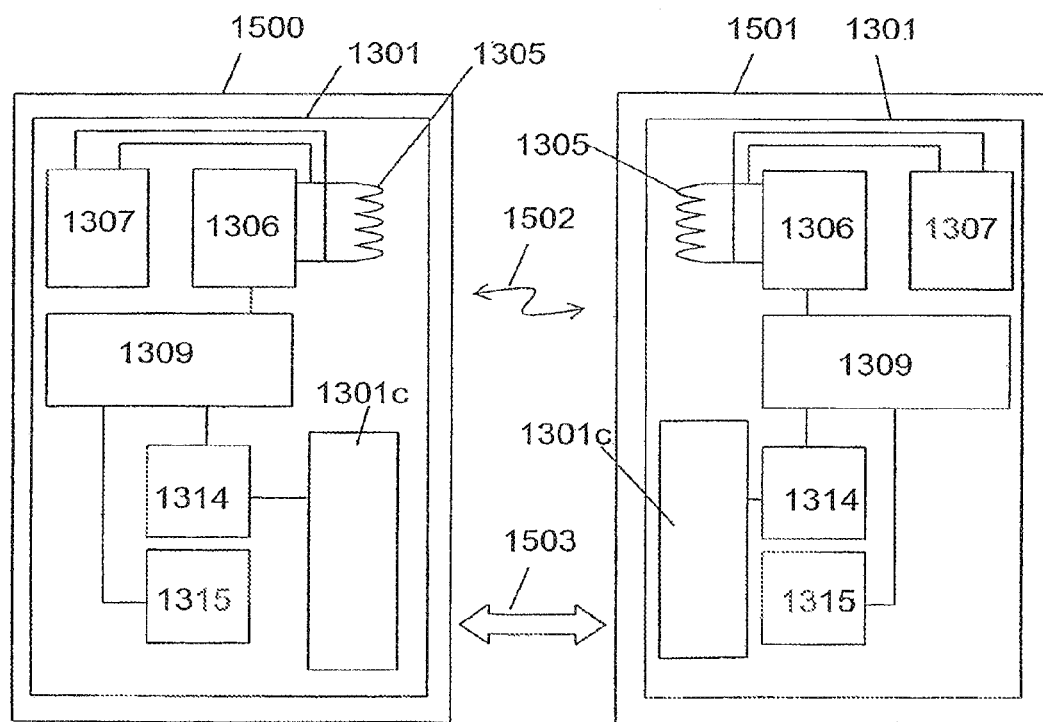
FIG. 2 shows a functional block diagram illustrating communication between two communications apparatus embodying the invention.

FIG. 2 shows a functional block diagram illustrating communication between two communications apparatus 1500 and 1501 embodying the invention where each of the communication apparatus is functionally the same as the communications apparatus 1301 described above with reference to FIG. 1. The controllers 1309 of the two communications apparatus 1500 and 1501 are configured such that the high data rate communicators 1301c cannot communicate data (as indicated by the double-headed arrow 1503) before RF field coupling (as indicated by the line 1502) between the short range wireless radio frequency communicators 1301a has occurred.

The two communications apparatus shown in FIG. 2 need not necessarily be identical; all that is required is that they can communicate using the same short range wireless radio frequency and high speed communications schemes, which may be any of those discussed above.

When one of the short range wireless radio frequency communicators is seeking to initiate communication by transmitting an RF signal and the other is responsive to a short range wireless radio frequency communicators seeking to initiate communication, then when the short range wireless radio frequency communicators of the two communications apparatus 1500 and 1501 are in range of one another, inductive coupling occurs via the magnetic field produced by the antenna of the transmitting short range wireless radio frequency communicator. Such an RF field may or may not be modulated. The power provider 1307 of the other communications apparatus may be configured to derive a power supply from that RF field. In such a case, the controller 1309 of the other communications apparatus may be configured such that high speed data communication may be effected by the high data rate data communicators 1301*b* as soon as the power provider 1307 derives sufficient power. As another possibility, an initialisation procedure may be required before data communication via the high data rate communicators 1301*b* can commence. For example, when the short range wireless radio frequency communicators 1301*a* come into range, then the short range wireless radio frequency communicators 1301*a* may conduct a short range wireless radio frequency communicator recognition process to ensure that the two communicators are compatible and are operating under the same or compatible protocols. As another possibility or additionally, the initialisation procedure may involve a validation, verification and/or authorisation process (in accordance with the communications protocol(s) under which the short range wireless radio frequency communicators operate) and the corresponding controller 1309 may be configured to enable or allow data communication between the high data rate communicators only once it has verified that the initialisation procedure has been successfully completed. As another possibility or additionally, at least one of the high speed data communicators may require from the other high speed data communicator authorisation or permission (in accordance with the communications protocol(s) under which the high speed data communicators operate) to enable data communication between the high data rate communicators. Once data communication between the high data rate communicators is enabled, then data communication occurs under the control of the controller 1309 via the high speed coupler 1301*c*. The actual rate of data communication will generally depend upon the nature and the amount of data to be communicated so that, for example, where only a small amount of data is to be communicated, then a data rate lower than the maximum possible may be used and this lower rate may or may not be at a data rate higher than a data rate achievable between the short range wireless radio frequency communicators.

Received data may be stored in, and data to be transmitted may be retrieved from, the corresponding data store under the direction of the controller 1309.

The short range wireless radio frequency and high speed communications conducted by communications apparatus 1301 need not necessarily be with a single other communications apparatus.

FIG. 3 shows a functional block diagram illustrating a system in which short range wireless radio frequency communication occurs between a short range wireless radio frequency communicator 1301*a* of a communications apparatus 1301 and a short range wireless radio frequency communicator 2301*a* of a short range wireless radio frequency communications apparatus 2101 and high data speed data communication occurs between the high data rate data communicator 1301*b* of the communications apparatus and a high data speed communications apparatus 2103. The short range wireless radio frequency communicator 2301*a* may be the same as or different from the short range wireless radio frequency communicator 1301*a* but will use one or a combination of the short range radio frequency techniques described above. The high data rate data communicators and high data rate data communications apparatus may use any of the high data rate communication techniques described above.

As shown in FIG. 3, the short range wireless radio frequency communicator 2301*a* of the short range wireless radio frequency communications apparatus 2101 comprises, like the short range wireless radio frequency communicator 1301*a* of the communications apparatus 1301, a signal communicator 1306 and a power provider 1307. For simplicity, not all of the connections to the power provider are shown. The short range wireless radio frequency communications apparatus 2101 also has a controller 2107 for controlling operation of the short range wireless communications apparatus 2101.

As shown in FIG. 3, the high data rate data communicator 2104 of the high data rate data communications apparatus 2103 comprises, like the high data rate data communicator 1301*b* of the communications apparatus 1301, a high speed data transceiver 1314 and has or has access to a data store 1315. The high data rate data communications apparatus 2103 also has a controller 2106 for controlling operation of the high data rate data communicator 2103.

The short range wireless radio frequency communications apparatus 2101 and the high data rate data communications apparatus 2103 may each be standalone apparatus or may each form a discrete unit or entity within a larger device, apparatus or system or may be provided by functionality provided within, for example distributed within, such a larger device, apparatus or system. Where the short range wireless radio frequency communications apparatus 2101 or the high data rate data communications apparatus 2103 forms part of a larger device, apparatus or system, then the corresponding controller 2107 or 2106 and/or at least part of the data store and/or any interface may be provided by that larger device, apparatus or system or the functions of these components may be split between the larger device or system and the communications apparatus. The short range wireless radio frequency communications apparatus 2101 and the high data rate data communications apparatus 2103 may additionally contain further functionality 2108 and 2105, respectively.

In operation of the system shown in FIG. 3, the controller 1309 enables data communication by the high data rate data communicator 1301*b* within the communications apparatus 1301 as set out above when the short range wireless radio frequency communicator 1301*a* within the communications apparatus 1301 receives power and/or data (represented by 2109) from an RF field supplied by the short range wireless radio frequency communicator 2301*a* of the short range wireless radio frequency communications apparatus 2101. This enablement of data communication may require an initialisation procedure, as set out above.

Once data communication has been enabled, data can transferred between the high data rate data communicator 1301*b* of the communications apparatus 1301 and the high data rate data communicator 2104 of the high data rate data apparatus 2103 under the control of the controllers 1309 and 2106 as represented by 2110. The actual rate of data communication will generally depend upon the nature and the amount of data to be communicated so that, for example, where only a small amount of data is to be communicated, then a data rate lower than the maximum possible may be used and this may or may not be at a data rate higher than a data rate achievable between the short range wireless radio frequency communicators 2301*a* and 1301*a*.

As set out above, the short range wireless radio frequency communications may use RFID or NFC technology which both utilize inductive coupling via the H field. Examples of short range wireless radio frequency communicators using RFID or NFC technology will now be described with the aid of FIGS. 4 to 14.

FIG. 4 shows a functional block diagram of an example of an RFID reader 100 which may be used to form the short range wireless radio frequency communicator 1301*a* or

2301*a*. RFID readers are described in various international standards such as ISO/IEC 14443, ISO/IEC 15693.

The RFID reader 100 has a signal communicator 100*a* comprising an RF signal generator 101 for generating an RF signal for supply to an antenna 102 (for example a coil) to cause a magnetic field (represented by the symbol referenced 105) to be generated in the space around the reader 100 and a demodulator 103 for demodulating a signal inductively coupled to the antenna 102. A reader controller 104 (for example a processor, state machine, RISC processor or microcontroller) is provided to control operation of the signal communicator 100*a*. When the controller 104 causes the signal generator 101 to generate an RF signal (which may or may not be modulated) so as to seek to initiate communication, any short range wireless radio frequency communicator (for example an RFID tag or NFC communicator operating in tag mode) within range of the magnetic field 105, will respond to the signal from the reader 100, in such a way that a modulated signal from that short range wireless radio frequency communicator is present at the antenna 102. Any such modulated signal present at the antenna 102 will be demodulated by the reader demodulator 103. The reader demodulator 103 provides a demodulated signal to the reader controller 104 which will affect the operation of the reader 100 in a manner which will depend upon at least one of data obtained from the demodulated signal and functionality of the reader 100. The reader 100 may have an interface 100*b* for enabling at least one of: supply of data or information to at least one of another device and a user; and input of data or information by at least one of another device and a user. Also, the reader 100 has a data store 100*c* for storing data.

The reader 100 may be a standalone device or may, as illustrated diagrammatically in FIG. 5, be incorporated within a larger device or system 200. The nature of the larger device or system will depend upon the particular application for the communications apparatus (and possibly also whether it is supplying or receiving data). Examples of possible larger devices or systems are given above. In this case, the reader 100 will operate in the same manner as the reader 100 shown in FIG. 4 except that the reader controller 104 is connected to a device interface 201 for enabling communication with the larger device or system so that data may be communicated between the reader and the larger device or system and so that, for example, an activity, functionality or operation of the reader or larger device may be affected by received data. It will of course be appreciated that the device interface 201 has connections, not shown, to other functionalities within larger device or system 200. In this example, the controller 104, interface 100*b* and/or data store 100*c* may be within the larger device or system 200 or the functions of any or all of these components may be split between the larger device or system and the communications apparatus.

In this example, the reader 100 is configured so as to enable the reader both to receive data from other short range wireless radio frequency communicators and, by modulating the signal supplied by the signal generator, to send data (for example control instructions and/or other data) to other short range wireless radio frequency communicators. As another possibility, the reader 100 may be able simply to read data from an in-range short range wireless radio frequency communicator.

FIG. 6 shows an example RFID data storage device or tag 300 which may form a short range wireless radio frequency communicator 1301*a* or 2301*a*. Example RFID tags are described in various international standards such as ISO/IEC 14443, ISO/IEC 15693.

The RFID data storage device or tag 300 has a signal communicator 300*a* comprising a data store 305 storing data, a tag demodulator 301 for demodulating a signal inductively coupled to an antenna 306 (for example a coil) of the tag and a tag modulator 303 for modulating an RF field present at the antenna 306. The data store 305 may be of any suitable form for use in an RFID tag, for example ROM, EEPROM or other suitable non-volatile or battery-backed up data storage, and may be writable or read-only depending upon the tag.

The tag also has a tag controller 304 for controlling operation of the tag and a power provider 302 comprising at least one of a power supply (such as a battery as mentioned above) and a power deriver configured to derive a power supply for the tag from a signal coupled to the tag antenna 306. For simplicity, not all of the connections to the power provider are shown.

In operation, when the tag 300 is in range of a short range wireless radio frequency communicator seeking to initiate communication such as the reader 100 shown in FIG. 4 or 5 so that the antenna 306 is in the magnetic field 307 generated by the reader 100 shown in FIG. 4 or 5 a voltage is generated across the antenna 306. The tag may operate in a number of different ways. For example, where the power provider 302 is a power deriver that derives power then the tag controller 304 may be configured to respond to powering up of the tag. As another possibility or additionally, the tag controller 304 may be configured to respond to data derived by the tag demodulator 301 from a modulated signal. The response of the tag controller 304 is to control the tag modulator 303 to cause a signal modulated in accordance with data read from the data store to be inductively coupled via the magnetic field 307 to the apparatus originally generating the field, the reader 100 (FIG. 4 or 5) in this example.

Where the tag receives a modulated signal and at least part of the data store 305 is writable then data derived by the demodulator or from another external stimulus may be written into the data store under the control of the tag controller 304. The tag may have an interface 300*b* for enabling at least one of: supply of data or information to at least one of another device and a user, and input of data or information by at least one of another device and a user.

The tag 300 may be a standalone device or may be incorporated within a larger device or system 400. The nature of the larger device or system will depend upon the particular application for the communications apparatus (and possibly also whether it is supplying or receiving data). Examples of possible larger devices or systems are given above.

Where the tag is part of a larger device or system, then as illustrated diagrammatically in FIG. 7, the tag controller 304 is connected to a device interface 401 for enabling communication with the larger device or system so that an activity, functionality or operation of the tag or larger device may be affected by received data. Otherwise, the tag 300 will operate in the same manner as the tag 300 shown in FIG. 6. It will of course be appreciated that the device interface 401 has connections, not shown, to other functionalities within larger device or system 400. In this example, the tag controller 304 and/or the interface 300*b* may be within the larger device or system 400 or their functions spilt between the larger device and the communications apparatus. In this case, the power provider 302 may supply power to some or all of larger device 400. Alternatively the power provider 302 may simply be a coupling to receive power from the larger device or system 400.

In the example shown in FIGS. 6 and 7, the tag 300 is configured so as both to receive data from another short range wireless radio frequency communicator and, by modulating an RF signal, to supply data to another short range wireless radio frequency communicator. As another possibility, the tag 300 may be able simply to supply data to another short range wireless radio frequency communicator.

FIG. 8 shows a more detailed functional block diagram of one example of the RFID reader 900 shown in FIGS. 4 and 5.

In this example, the controller 104 is a microcontroller 916 and the signal communicator comprises an RF signal generator 957 that generates an RF carrier signal at 13.56 MHz and a differential driver 958 for modulating the RF signal in accordance with modulation control signals 959 from the microcontroller 916 and for supplying the modulated signal to antenna circuitry in order to communicate data (for example control instructions and/or other data) to another communications apparatus by inductive coupling of the magnetic field (the H field). As shown, the antenna circuitry is in the form of a tuned circuit that comprises a coil 907 forming the antenna and capacitors 901, 902, 950 and 951 to reduce unwanted carrier harmonics.

The modulation control signals 959 supplied by the microcontroller 916 control, in this example, the amplitude of the RF carrier signal that the differential driver 958 provides to the antenna circuitry. The differential driver 958 outputs complementary pulses using techniques known to persons skilled in the art. Microcontroller 916 will typically use modulation control signals 959 sent to the differential driver 958 to alter at least one of the signal level and the modulation depth, in accordance with the binary data desired to be sent according to a predetermined pattern of ones and zeros.

An unmodulated carrier signal may be required when, for example: another short range wireless radio frequency communicator is supplying data (for example control instructions and/or other data) to the reader; or when the RFID reader is operating in a detection mode in which the RFID reader supplies an RF signal to provide a field which acts to "wake-up" another in-range short range wireless radio frequency communicator such as an RFID tag to cause that short range wireless radio frequency communicator to communicate with the RFID reader; or where an in-range short range wireless radio frequency communicator is configured simply to use the RF signal to derive power and/or to supply data back to the RFID reader, for example where the short range wireless radio frequency communicator is an RFID tag. In these cases, the microcontroller 916 outputs modulation control signals 959 that cause the differential driver 958 to output the full amplitude, unmodulated, RF signal.

Capacitors 955 and 956 are provided to limit the amplitude of the signal input 954 to the demodulator 950 so as to avoid over-voltage damage to the demodulator 950 which outputs demodulated signals in binary form to microcontroller 916.

In an example, the RF signal generator 957 is constructed to generate the RF signal by sine synthesis so that the RF signal generator 957 provides a pulse-width modulated (PWM) or a pulse-density modulated (PDM) digital signal to the differential driver 958. The RF signal generator 957 comprises a Read Only Memory (ROM) (not shown) and a shift register (not shown). The PWM or PDM signal is generated from a code generated by a sine synthesis technique known to persons skilled in the art and stored in the Read Only Memory (ROM) (not shown). The ROM data is fed to the shift register which outputs the PWM or PDM serial data stream.

Persons skilled in the art will know that the sine synthesis PWM or PDM code could be generated by alternative means such as a processor running a pre-configured algorithm or other techniques such as direct digital synthesis. The PWM or PDM data stream controls the differential driver 958 such that complementary pulses are output in the most advantageous way to minimize unwanted RF signal frequencies being emitted. It may be possible to omit the capacitors 950 and 951 if the signals from differential driver 958 do not infringe emissions regulations. If the sine synthesis technique is not used, then additional filtering circuitry may be required, for example additional inductors and capacitors at signal nodes 952 and 953, to conform to emissions regulations.

In operation, the RFID reader described with reference to FIG. 8 generates and emits an independent RF carrier signal, which may or may not be modulated, and so implements a "carrier generation" modulation communication method FIG. 9 shows a more detailed functional block diagram of one example of the RFID tag shown in FIGS. 6 and 7.

The RFID tag 1000 shown in FIG. 9 has signal reception circuitry comprising a capacitor 1012 and antenna 1006 formed as a coil inductor. An externally generated magnetic field (for example from the RFID reader shown in FIG. 8) inductively coupled to the antenna induces an ac voltage across the signal reception circuitry. In this example, the power provider is a power deriver which derives a power supply for the tag 1000 from the induced ac voltage. The power deriver 1002 consists of a diode 1008, an energy storage capacitor 1009, and an over-voltage protector 1010. The over-voltage protector 1010 operates to stop voltages on either positive or negative half-cycles of the induced ac voltage from rising to a level where damage could occur to any part of the RFID tag 1000.

In this example, at least part of the data store 1005 comprises programmable memory, for example electrically erasable programmable read only memory (EEPROM) 1005.

In this example, the tag controller is in the form of a state-machine 1004. When the tag is powered, the state-machine 1004 sends a modulation signal 1011 to a control electrode of a transistor 1003 forming the modulator and having a known on-resistance. The modulation signal 1011 consists of binary data representing a predetermined pattern of ones and zeros. The binary data may represent one or more of: a control sequence arranged to operate within state machine 1004; data contained within the data store 1005; and data received by RFID tag 1000. When the modulation signal switches on the transistor 1003, an impedance is switched across the signal reception circuitry. This impedance change 1001 is coupled to the antenna 1002 of the short range wireless radio frequency communicator that emitted the RF signal and causes a signal variation that is demodulated by the demodulator within the other short range wireless radio frequency communicator coupled to the RFID tag.

The RFID tag described with reference to FIG. 9 above thus communicates by "load modulation", that is by modulating the impedance of the signal reception antenna circuitry.

As described with reference to FIGS. 4 to 9, the short range wireless radio frequency communicators are RFID communicators. FIGS. 10 to 14 illustrate an example where the short range wireless radio frequency communicators are NFC communicators.

FIG. 10 shows a functional block diagram of an example of an NFC communicator 500 which may be used to form a short range wireless radio frequency communicator. The NFC communicator may operate under international standards such as ISO/IEC 18092 and ISO/IEC 21481.

The NFC communicator 500 has a signal communicator comprising an RF signal generator/modulator 501, a demodulator 503 and a data store 507. In addition, the NFC communicator 500 has an antenna 502, an NFC controller 504 and a power provider 506. For simplicity, not all of the connections to the power provider are shown. The NFC communicator 500 may have an interface 500a for enabling at least one of: supply of data or information to at least one of another device and a user; and input of data or information by at least one of another device and a user.

An NFC communicator can be controlled by the controller 504 to operate in a "reader mode" (in which the NFC communicator is an "initiator", that is it is seeking to initiate communication with a responsive communicator) or in a "tag mode" (in which the NFC communicator is a "target", that is it is responsive to another communicator seeking to initiate communication). When an NFC communicator is operating as an initiator, the NFC communicator operates in a manner similar to that described for the reader of FIG. 4. When an NFC communicator is operating as a target, the NFC communicator operates in a manner similar to that described for the tag shown in FIG. 6.

In this example, when the NFC communicator 500 is operating in the tag mode, the antenna 502, demodulator 503, power provider 506, NFC controller 504 and data store 507 function in a similar manner to the antenna 306, tag demodulator 301, power provider 302, controller 304 and data store 305 shown in FIG. 6 while the RF signal generator/modulator 501 functions in a similar manner to the signal generator and tag modulator 303 in FIG. 6. When the NFC communicator 500 is operating in the reader mode, the RF signal generator/modulator 501, antenna 502, demodulator 503 and NFC controller 504 function in a similar manner to the corresponding components 101, 102, 103, and 104 in FIG. 4 and act to create a magnetic field 505 which has similar characteristics to the field 105 of FIG. 4.

An NFC communicator may have either the reader mode or the tag mode as its default mode. A mode change may be effected by, for example, an operation of a larger device within which the NFC communicator is provided, receipt of an externally generated RF signal or as a result of an instruction from the controller 504. Preferably the NFC communicator will be set to operate in tag mode as the default as this has the advantage of saving power within the communicator or larger device. The NFC communicator may automatically switch to reader mode at certain time intervals or on receipt of a signal, for example from the larger device. The switch may also occur as the result of the detection of an externally generated RF field, for example generated by an active tag system. As an alternative, the NFC communicator could operate in reader mode as the default but transmit its RF signals at pre-defined intervals rather than continuously so as to save power. The switch to tag mode may then occur on detection of an externally generated RF signal, for example from another NFC communicator.

The NFC communicator 500 may be a standalone device or may, as illustrated diagrammatically in FIG. 11, be incorporated within a larger device or system 600. The nature of the larger device or system will depend upon the particular application for the communications apparatus (and possibly also whether it is supplying or receiving data). Examples of possible larger devices or systems are given above. In this case, the NFC communicator 500 will operate in the same manner as the NFC communicator 500 shown in FIG. 10 except that the NFC controller 504 is connected to a device interface 601 for enabling communication with the larger device or system so that an activity, functionality or operation of the NFC communicator 500 or larger device may be affected, depending upon the received data. It will of course be appreciated that the device interface 601 has connections, not shown, to other functionalities within larger device or system 600. In this example, the NEC controller 504, any interface 500a and/or data store 507 may be within the larger device or system 600 or the functions of any or all of these components may be split between the larger device or system and the communications apparatus.

FIG. 12 shows a more detailed functional block diagram of one example of the NFC communicator shown in FIGS. 10 and 11.

As shown in FIG. 12, the NFC communicator 1100 includes a microcontroller 1132, a signal modulator 1102 for modulating a signal in accordance with data provided by the microcontroller, a differential driver 1104 for supplying a modulated signal to an antenna 1122 and a phase-locked loop 1149 comprising, in this embodiment, a voltage controlled oscillator (VCO) 1108, a phase detector 1110, and track and hold circuitry 1118 comprising a loop filter and preferably a sample and hold circuit which includes a switch 1116.

The NFC communicator 1100 may, as shown in FIG. 12, include a modulation controller 1106 for controlling, under the instruction of the microcontroller 1132, the amplitude of the signal supplied by the signal modulator 1102. A signal strength determiner 1130 may be coupled to the antenna 1122 to capture a sampled measurement of the strength of an incoming RF signal (in this embodiment an RF signal at 13.56 MHz) to provide a signal strength signal to the microcontroller 1132 and the modulation controller 1106. The signal strength signal may be used by the microcontroller 1132 and modulation controller 1106, in conjunction with other calibration or predictive data if required, to set and control the modulation depth, to a desired value.

In this example the RF signal fed to the antenna 1122 is in digital square-wave form and so, by comparison with FIG. 9, additional filtering components (inductors 1160 and 1161 and capacitors 1162 and 1163) may be required to reduce harmonics of the carrier so that emissions regulations are met. A clamp 1120 is provided across the antenna 1122 to reduce the risk of high voltages destroying chip functionality. In the event a high voltage does occur, for example when the communications apparatus is in the magnetic field of another RF reader device, current is diverted through the clamp thereby preventing the high voltage from adversely affecting the functionality of the communications apparatus.

A data store 1134 is provided within or so as to be accessible by the NFC communicator 100, for example the data store 1134 may be part of the microcontroller 1132, a separate component or part of larger device.

The communications apparatus 1100 has a power provider 1100a. For convenience the connections of the power provider to the remainder of the apparatus are not shown. The power provider may comprise at least one of a power deriver, a power supply provided within the communications apparatus 1100, or a connection to a power supply of another device or system. Examples of possible power supplies are described above. The power deriver may be used when the communications apparatus is operating in either the reader mode or the tag mode with the power deriver deriving a power supply from a larger device or system of which the communications apparatus is a part or from an externally generated RF field or signal.

NFC communicators can use an active protocol or a passive protocol. FIG. 13 is a diagram illustrating the passive protocol. As can be seen, in this protocol, the NFC communicator operating as the initiator maintains its RF signal throughout the duration of all communications sequences of initiator command and target response occurrences (two such "passive" initiator command $I_1$ and $I_2$ and target response $T_1$ and $T_2$ occurrences are shown in FIG. 13). In contrast, when an active protocol is used as illustrated by FIG. 14, the NFC communicator operating as an initiator switches off its RF signal when it finishes sending a command and a responding target NFC communicator switches on its RF signal to send its response information back to the initiator (two such "active" initiator command $I_3$ and $I_4$ and target response $T_3$ and $T_4$ occurrences are shown in FIG. 14).

When the NFC communicator 1100 is operating in the reader mode, that is as the initiator, the microcontroller 1132 will normally cause the NFC communicator to operate using the carrier generation method described above with reference to FIG. 9 so that, in this example, the functional components 1132, 1122 and 1148 shown in FIG. 12 function in the same manner as the functional components 916, 907 and 950, respectively, shown in FIG. 9 and the functional components 1102 and 1104 function in the same manner as the functional component 958 in FIG. 9.

When the NFC communicator 1100 is operating in the tag mode, that is as the target, the microcontroller 1132 will normally cause the NFC communicator to operate using a carrier interference method that simulates the load modulation method by using, for example, an active signal generated to be at the same frequency as, and at a fixed phase relation to, the incoming carrier signal. This carrier interference method is advantageous for the NFC communicator because it allows the same antenna easily to be used in both the reader mode and tag mode.

Thus, when the NFC communicator 1100 is operating in the tag mode, the VCO 1108 of the NFC communicator continuously generates an internal RF signal. When another short range wireless radio frequency communicator (an RFID reader as described above or another NFC communicator operating in reader mode) is in range, an externally generated RF signal (in this embodiment a 13.56 MHz RF signal) is coupled to the antenna 1122. The phase-locked loop 1149 acts to bring the internally generated RF signal into phase with the received (externally generated) RF signal. Thus, the phase detector 1110 detects the difference in frequency and phase between the VCO generated RF signal and the externally generated RF signal and supplies a signal to the loop filter to adjust the voltage generated by the loop filter. This in turn adjusts the phase and frequency of signal generated by the VCO 1108. This process is continuously repeated to ensure the VCO signal and external RF signal are phase-matched.

The phase lock loop process continues until an instruction to modulate and transmit the internally generated RF signal is received from the microcontroller 1132. This may occur as soon as phase locking between the external RF signal and VCO generated signal has been detected by microcontroller 1132. Alternatively, this may occur once apparatus is ready to transmit data, for example at a time interval prescribed by operating protocols such as those set out in ISO 14443.

Persons skilled in the art will know that combinations of other known techniques could be used to provide the functionality of the phase lock loop 1149.

The microcontroller 1132 then controls the modulator 1102 (and modulation controller 1106 if present) so as to cause the NFC communicator to transmit the phase-locked VCO generated RF signal modulated in accordance with data supplied by the microcontroller 1132. This part of the operation is similar to the operation of the RFID tag described above with reference to FIG. 9.

The modulated VCO generated signal 1142 transmitted by the antenna 1122 interferes with the externally generated RF signal 1140. Different types of modulation or interference or combinations of modulation/interference are possible for the transmission of the VCO generated RF signal, for example in-phase only causing constructive interference, out-of-phase only causing destructive interference, a combination of in- and out-of phase, partially in- and/or out-of phase or a combination of partially in- and/or out-of phase. Thus, the interference may be destructive or constructive interference or a combination of both.

The other short range wireless radio frequency communicator (an RFID reader or other NFC communicator operating in reader mode) demodulates this interference-modulated signal in exactly the same way that it would demodulate an inductively coupled modulated signal from, for example, an RFID tag.

As described above the RFID reader shown in FIG. 8 and the RFID tag described with reference to FIG. 9 above operate by "carrier modulation" and 'load modulation', respectively. Of course, if an RFID tag has the capability to generate a carrier signal, then the tag may use a "carrier modulation" method while the RFID reader may use either a "carrier modulation" or a "load modulation" method. The NFC communicator described above with reference to FIG. 11 operates using a carrier interference method that simulates the load modulation method by using, for example, an active signal generated to be at the same frequency as, and at a fixed phase relation to, the incoming carrier signal. The "carrier interference" method could be used with an RFID reader and an RFID tag (if the latter has a signal generator).

Variations or combinations of the 'carrier generation' 'load modulation' and 'carrier interference' may be used. For example, the sine synthesis method described with reference to FIG. 9 may be used in the interference modulation method described with reference to FIG. 12. Persons skilled in the art will know that the methods described with reference to FIGS. 8, 9 and 12 are examples and that there are many other methods and combinations of methods that can be used to provide the necessary NFC/RFID functionality.

FIGS. 15*a* and 15*b* show a flow diagram for illustrating an example of communication between a communications apparatus 1500 embodying the invention and another communications apparatus 1501 having both a short range wireless radio frequency communicator and a high data rate data communicator as shown in FIG. 2. The operations carried out by the communications apparatus 1500 are shown in solid lines and on the left hand side in FIG. 15 while the operations carried out by the other communications apparatus 1501 are shown in dashed lines and on the right hand side in FIG. 15. In this example, the other communications apparatus 1501 operates as the reader or initiator and the communications apparatus 1500 operates as the tag or target.

At S2501 the short range wireless radio frequency communicator of the other communication apparatus 1501 seeking to initiate short range wireless communication supplies an RF signal. At S2502 the short range wireless radio frequency communicator of the communications apparatus 1500 is within range of the other communication apparatus 1501 and so receives the RF signal. At S2503 the short range wireless radio frequency communicator of the communication apparatus 1500 derives a power supply from the received RF signal. An initialisation procedure comprising at least one of a short range wireless radio frequency communicator recognition process, a verification, authorisation and/or validation process for the data request (for example verification, authorisation and/or validation of a payment) may then be carried out. The initialisation procedure may also include security, data encryption, and payment transaction routines. The initialisation procedure may be effected by communication of data between the short range wireless radio frequency communicators by modulation of the RF signal in accordance with the initialisation procedure. In this case or in any other case where the other communication apparatus modulates the RF signal, the demodulator of the communications apparatus 1500 will supply the demodulated RF signal to the controller of the communications apparatus 1500 and at S2505 the controller of the communications apparatus 1500 will receive the demodulated RF signal and act in accordance with the initialisation procedure, for example simply enable data communication between the high data rate data communicators or take further steps in accordance with any security, encryption, payment transaction and verification routines of the initialisation procedure.

When the initialisation procedure is complete, then, at S2506 the controller of the communications apparatus 1500 initiates data communication to and/or from the data store 1315 via the high-speed data transceiver 1314. While this data transfer is taking place, power is maintained at the communications apparatus 1500 operating in tag mode (and therefore for the data transfer) via the inductive coupling provided between the in-range short range wireless radio frequency communicators.

The controller of the communications apparatus 1500 may at S2511 cause the modulator to modulate the received RF signal with a high data rate transfer initiation signal so that at sS2512 the short range wireless radio frequency communicator of the other communication apparatus 1501 receives the modulated signal to indicate to its high data rate controller that data communication via the high speed data transceiver is about to begin.

At step S2507 the controller of the communications apparatus 1500 causes the high speed data transceiver 1314 of the high data rate communicator 1301b to communicate data with the high speed data transceiver of the high data rate communicator of other communication apparatus, in this example to transfer data from the data store 1315 to the high speed data transceiver of the high data rate communicator of the other communication apparatus.

At S2508 the high speed data transceiver of the high data rate communicator of other communication apparatus 1501 receives the data sent from the data store 1315.

At S2509 the controller of the other communication apparatus 1501 recognises that the data communication by the high data rate data communicators has been completed by, for example, recognising a special end of transfer code in the received data or by determining that a predetermined time interval in which no data is transferred has expired. Then, at S2510 the other communication apparatus 1501 switches off the RF signal so that the power supply for the communication apparatus 1500 will decay away to zero.

Where the communication apparatus 1500 has its own power supply, then the operation S2503 will be omitted and the short range wireless radio frequency communicator will communicate with the short range wireless radio frequency communicator of the other communication apparatus at S2504 to initiate the communications procedure.

Where as shown in FIG. 3, the other high data rate data communicator and short range wireless radio frequency communicator are separate entities, then the operations will be the same as shown in FIG. 15 except that controller of the communication apparatus 1500 will initiate data communication with the separate high data rate data communicator 2103 at S2506 once verification has been completed with the other short range wireless radio frequency communicator 2101 and it will be the controller of the high data rate data communicator 2103 that recognises at S2509 that the high data rate data transfer have been completed by, for example, recognising a special end of transfer code in the received data or by determining that a predetermined time interval in which no data is transferred has expired.

A number of variations to and modifications of the communications apparatus shown in FIG. 1 will now be described with reference to FIGS. 16 to 23.

FIG. 16 shows a functional block diagram of another embodiment of a communications apparatus 1600. The communications apparatus 1600 shown in FIG. 16 differs from that shown in FIG. 1 in that it includes a display 1601 and in that the controller 1309 is configured to provide a power supply to the display 1601 when the power provider 1307 provides a power supply, for example when the power provider derives a power supply from another communications apparatus (as in FIG. 2) or a short range wireless radio frequency communications apparatus (as in FIG. 3). The controller 1309 is operable to control high data rate data communicator 1301b such that display data received from another communications apparatus (as in FIG. 2) or a high data rate data communications apparatus (as in FIG. 3) causes the display 1601 to display an image or causes an existing displayed image to be modified. In this example, the display is a bistable display such as a bistable ferroelectric liquid crystal display, that is a display which retains the currently displayed image when the power supply is switched off, so that when the short range wireless radio frequency communicators are no longer coupled and the power deriver 1307 can no longer supply a power supply, the image will remain on the bistable display 1601. The communications apparatus 1600 may be in the form of an advertising device such as an advertising poster or could be a programmable "post-it" note or L fridge magnet. As mentioned above, the communications apparatus 1600 may form part of a larger device, apparatus or system in which case the power provider may simply receive power from that larger device, apparatus or system. In this case and in a case where the power provider is a power supply as mentioned above, then the display need not necessarily be a bistable display.

FIG. 17 shows a functional block diagram illustrating another embodiment of communications apparatus which differs from that shown in FIG. 1 in that the high data rate data communicator 1301b of the communications apparatus has a power supply 1802 in the form of any one or more power supply or energy storage devices such as for example: batteries, capacitors, solar cells, electromechanical generators, acoustic transducers, and fuel cells. A switch 1803 controlled by the controller 1309 is provided to enable connection of the power supply. The power supply 1802 may be used to power the communication apparatus or parts thereof only at certain times, for example at times where a power supply is not being provided by the power provider of the short range wireless radio frequency communicator perhaps because the short range wireless radio frequency communicator is no longer in range of the other short range wireless radio frequency communicator from which it was deriving the power supply. As another possibility, the power supply 1802 may be used for certain parts of the communications apparatus 1301 with other parts deriving power from the power provider 1307.

FIG. 18 shows a modified version of the communications apparatus shown in FIG. 17 in which the power supply 1802 is chargeable or rechargeable and where a charging energy supplier 1903 is coupled via a contact coupling 1902 (such as a USB link) or a contactless coupling 1904 to the said power supply 1802. As shown, the contactless coupling 1904 is an inductive coupling mechanism, but persons skilled in the art will appreciate that other forms of contactless coupling may be used such as far field coupling. The charging energy supplier 1903 is shown as internal in FIG. 18 but may be either internal to or external to the communications apparatus 1301. The charging energy supplier 1903 may be of any suitable form, for example any one or any combination of a solar cell, an electromechanical generator, an acoustic transducer or a 50/60 Hz mains hum energy harvester, or a fuel recharger if the power supply comprises a fuel cell.

FIG. 19 shows a modified version of the communications apparatus shown in FIG. 17 in which the power supply 1802 is again chargeable or rechargeable via a contact coupling 1902 or a contactless coupling 1904 but in this case the charging energy is supplied via the power provider 1307.

In either case, generally, although not necessarily, the charging energy will be supplied either before or after any communications via the high data rate data communicator. As another possibility, power may also be derived as a result of short range wireless radio frequency communication at antenna 1305 which may directly supply power to the communications apparatus or may be used to charge or re-charge some power supply within the apparatus or a larger device, apparatus or system incorporating the communications apparatus.

Providing such power supply 1802 or some form of power storage (such as a large storage capacitor that may be charged up by power derived by the power deriver) within the communications apparatus has the advantage that the short range wireless radio frequency communicator may not need to stay in range of the other short range wireless radio frequency communicator during communications via the high data rate data communicator.

FIG. 20 shows a functional block diagram illustrating another embodiment of communications apparatus in accordance with the present invention wherein the high data rate coupler of the high data rate data communicator 1301b is provided by the antenna 2402 of the short range wireless radio frequency communicator 1301a. The antenna 2402 may adapted to operate at two separate frequencies, although the same frequency may be used where the high-speed data xMax communication method is used. The antenna 2402 has at least three-terminals to enable it to be connected to both the signal communicator 1306 and the high speed data transceiver 1314. Antenna 2402 may advantageously contain one or more coil and/or one or more other antenna elements such as dipole and/or one or more other matching or coupling components.

FIG. 21 shows a functional block diagram illustrating another embodiment of communications apparatus in accordance with the present invention. This communications apparatus provides a user interface 2616 in the form of at least one of a user indicator for indicating to the user information about the communications apparatus (for example to indicate that a transaction or data transfer is taking place or has taken place) and a user input for enabling a user to control operation of the communication apparatus. For example, user input could be used to confirm a payment instruction or acceptance of a transaction or acceptance of initiation or completion of a data transfer.

Where present, the user indicator may be, for example, at least one of a series of LEDs, a display screen, a user interface device and an audio device such as a loudspeaker while the user input may be a series of buttons or other input device. The user indicator will be controlled by the controller 1309. In this example, the controller 1309 may also control or be controlled by further functionality 2620.

The further functionality 2620 could be used as a mechanism to re-program or re-configure the communications apparatus 1301. Alternatively or additionally the further functionality may provide additional or further short range wireless radio frequency communications functionality. As another possibility, the further functionality may control access to a memory, control or interface system within a larger device, apparatus or system where the apparatus 1301 either forms part of or can be attached or fitted to that a larger device, apparatus or system. The further functionality 2620 may be provided within the communications apparatus.

As another example the further functionality could comprise a separate memory for the short range wireless radio frequency communicator 1301a to enable full communication and/or interaction with other short range wireless radio frequency communicators i.e. a dual action memory card or device. As an example, the further functionality 2620 may comprise the data and/or protocols necessary for the short range wireless radio frequency communicator 1301a to act as an ISO/IEC 14443a compatible tag.

FIG. 22 shows a functional block diagram illustrating another embodiment of communications apparatus in accordance with the present invention where the communications apparatus has an additional power and/or data provider 2202 configured to couple 2003 to a power and/or data provider 2204 of another apparatus 2206 having further functionality 2205, for example in the form of at least one of data storage, control and security.

FIG. 23 shows a simplified perspective view to illustrate one way in which communications apparatus embodying the invention may physically interact with such another apparatus 2206. In this example, the communications apparatus 2301 has a housing 2305 having a recess 2303 for receiving the packaging or housing 2302 of the other apparatus 2206. The housing may be free-standing or form part of a larger device or system. As shown in FIG. 23, the coupling between communications apparatus 1301 and apparatus 2206 is by way of direct contacts 2304 and 2303 carried by the respective housings. As another possibility, the coupling between apparatus 1301 and apparatus 2206 may for example be any of the contactless method described herein and may include any one or combination of RFID, inductive, capacitive, IR or any other method known to persons skilled in the art.

In a preferred embodiment, the communications apparatus 1301 shown in FIG. 22 is a memory card, for example a flash memory card. This memory card may be stand-alone, integrated within a larger device or as shown in FIG. 22 receivable in an interface slot of a larger device (for example a portable device such as a mobile telephone or PDA) and the other apparatus 2206 is a secure electronic banking token conforming to international standard ISO 7816. In this example, the power and/or data provider 2204 derives a power supply from the power and/or data provider 2202. The power and/or data providers 2202 and 2204 may have high data rate communication capability such as that as mentioned above for the high data rate data communicator 1301b. The further functionality 2205 of the secure electronic banking token enables secure, for example encrypted, data communication for, for example, financial transactions with another device or via a mobile telephone. Where a portable device such as a portable communications device, for example a mobile telephone, is provided with such a communications apparatus a user can, for example, use the communications apparatus as a high capacity memory to store data such as music and/or image data and be able at the same time to connect a secure banking token 2206 to the mobile telephone to provide, for example, an electronic purse and/or an access ticket, for example a transport ticket. This enables a user to use both the memory card and the secure banking token at the same time even where the larger device has only a single interface slot so that the user can access their stored data (such as music and/or image data) even where the secure token provider is not willing to provide the amount of memory desirable for storage of data such as music and/or image data.

It will of course be appreciated that communications apparatus embodying the invention may comprise any one or any combination of the modifications and variations described above with reference to FIGS. 16 to 23.

There are many and numerous applications for communications apparatus embodying the invention. A number of examples of such applications will now be described with the aid of FIGS. 24 to 29.

Figure 24:
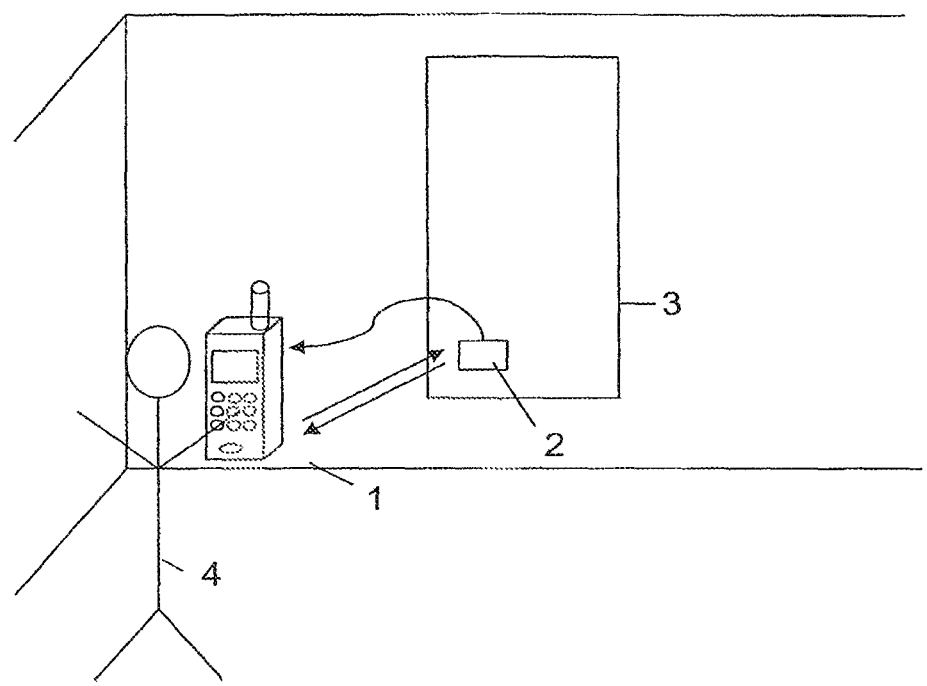

FIG. 24 shows a diagram for illustrating one application. In this example, the functionality of a communication apparatus capable of acting as a reader or initiator and embodying the invention is incorporated within a mobile communications device 1 (such as a mobile telephone (cellphone) or telecommunications-enabled Personal Digital Assistant (PDA) or other portable computing device) and another communication apparatus 2 is incorporated in a poster or other media 3. The poster may be an advertising poster displayed in a shop or on street hoarding or could be a poster purchased by the user. As other possibilities, the media may be a document, envelope or the like or could be a surface as a wall, surface of a product, product packaging, a surface of an item of furniture or equipment and so on. The poster may be provided by the bistable display shown in FIG. 16.

The communication apparatus 2 carried by (for example incorporated within or secured to) the poster or other media is capable of acting as a tag or an NFC communicator in the tag mode and will generally be a passive communications apparatus, that is an apparatus which has a power deriver for deriving power from an externally supplied RF signal. For example, the communication apparatus 2 may comprise a contact-less memory card such as a flash memory card embedded in the poster 3. As shown in FIG. 24, a consumer 4 holds the mobile communications device 1 within range of the communication apparatus 2 within the poster and initiates short range wireless radio frequency communication. The mobile communications device 1 may be configured so that the short range wireless radio frequency communicator (RFID reader or NFC in reader mode for example) of the mobile communications device 1 is switched on when the mobile communications device 1 is switched on or, where the communications apparatus has a user interface connection, the consumer may switch on the short range wireless radio frequency communicator. An initialisation procedure is carried out which may include a communications apparatus recognition or identification process to enable the communications apparatus 2 to determine whether the data should be supplied to this particular mobile communications device 1.

Where payment or authorisation is required for the data carried by the poster, then following recognition or identification, the controller of the poster communication apparatus 2 will cause its short range wireless radio frequency communicator to modulate the RF signal with data requesting payment or payment confirmation prior to supply of the data. Thus, the short range wireless radio frequency communicator may communicate instructions to the short range wireless radio frequency communicator of the mobile communications device 1 to instruct the user how to effect or verify payment. For example, the mobile communications device 1 may be caused to display a message along the lines of:

"Input download authorisation code provided by authorisation facility . . . " followed by identification of the authorisation facility which may be at least one of a physical location (for example a kiosk near the poster or a local retail outlet) and at least one network location such as a telephone number for enabling payment by voice or text message, a WAP address and an Internet address.

Once the user has completed the necessary communication with the authorisation facility (including any necessary payment) and obtained and input the authorisation code via the user interface of their mobile communications device 1, for example using its keypad, then the short range wireless radio frequency communicator of the mobile communications device 1 communicates this payment code to the short range wireless radio frequency communicator of the communications apparatus carried by the poster and, assuming the code is verified, the controller of the poster communications apparatus instructs its high data rate data communicator to commence data transfer to the high data rate data communicator of the communications apparatus of the mobile communications device 1. Where the high data rate communicators operate over a longer range (for example where the high data rate communicators are MBOA UWB or DS-UWB communicators) than the short range wireless radio frequency communicators then the user may move away from the poster during the data communication by the high data rate communicators, provided sufficient power is available to enable completion of the data communication.

As another possibility, the user may subscribe to a service that enables the authorisation procedure to be automated so that it is not necessary for the user to be involved, rather the mobile communications device 1 may automatically contact the network location of the authorisation facility and supply the authorisation code directly to the poster communications apparatus. In this case, the user will normally be required to confirm agreement before the authorisation to complete the transaction and download the data is given. For example the mobile communications device 1 may display a message from that service provider along the lines of:

"A payment of . . . for data download will be deducted from your account. To confirm acceptance press "Yes""

Once the user has confirmed acceptance or the authorisation code has been received, then authorisation data is communicated from the short range wireless radio frequency communicator of the mobile communications device 1 to the short range wireless radio frequency communicator of the communications apparatus 2 via modulation of the supplied RF signal. The demodulator of the short range wireless radio frequency communicator of the communications apparatus 2 supplies the demodulated data to the controller 1309 which determines whether the required authorisation code has been provided and, if so, initiates or supplies authorisation for data transfer from the data store 1315 of the requested data to the mobile communications device 1 via the high speed data communicators of the communications apparatus 2 and the mobile communications device 1. As an example, the data may be at least one of music, image and video data, for example MP3 or similar music data files.

In this example, where payment via a communications network is not required (for example where payment may be at a kiosk), the device 1 may be a mobile device without communications facilities.

As further example of an application of communications apparatus embodying the invention, the communications apparatus could be a standalone device in the form of a credit/debit or other electronic payment card. The security and storage features that may be provided in communications apparatus embodying the invention could enable the apparatus to be used as a combined multimedia memory card and contactless credit card. The communications apparatus embodying the invention in such an example would act to initiate both transfer of data from the multi-media memory card and transfer of funds or authorisation of credit.

The short range wireless radio frequency communicator of communications apparatus embodying the invention may, depending upon its application, require no authorisation/verification of an incoming RF signal and/or may require the provision of multiple data sets/instructions. In addition initialisation by the short range wireless radio frequency communicators may also be combined with initialisation between the high data rate data communicators. At least one of the short range wireless radio frequency and the high data rate communications may also be security encrypted, for example in the case of transfer of encrypted payment details.

Figure 25:
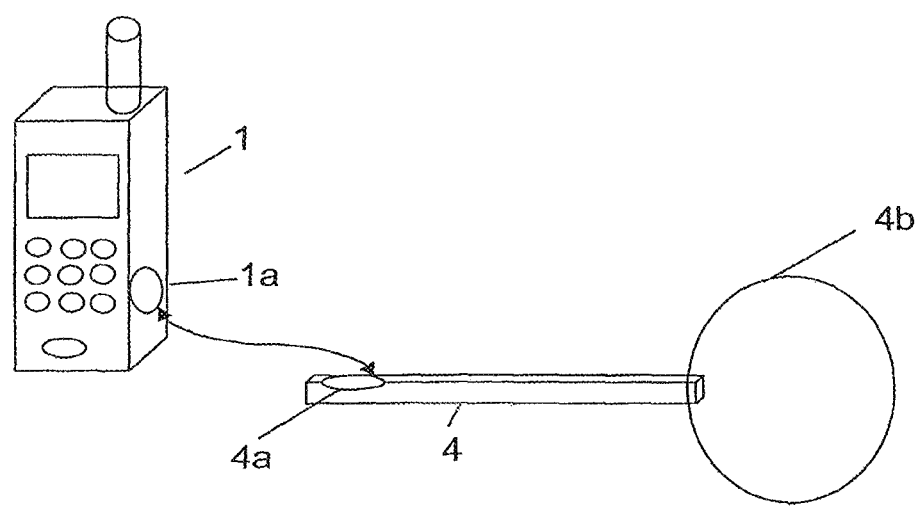

FIG. 25 shows a diagram representing a further application in which communications apparatus 4a capable of acting as a tag or target is incorporated in a flash memory card 4 configured to act as a security key or access device for a mobile device. In this application, the mobile device includes some or all functionality 1a of communications apparatus embodying the invention capable of acting as a reader or initiator such that operation of the mobile device can only commence after a user has brought the mobile device into close proximity to the said memory card enabling communication between the short range wireless radio frequency communicators and subsequent data communication between the high data rate data communicators. Such a memory card may, for example, be fixed to a user's key ring 4b.

Figure 26:
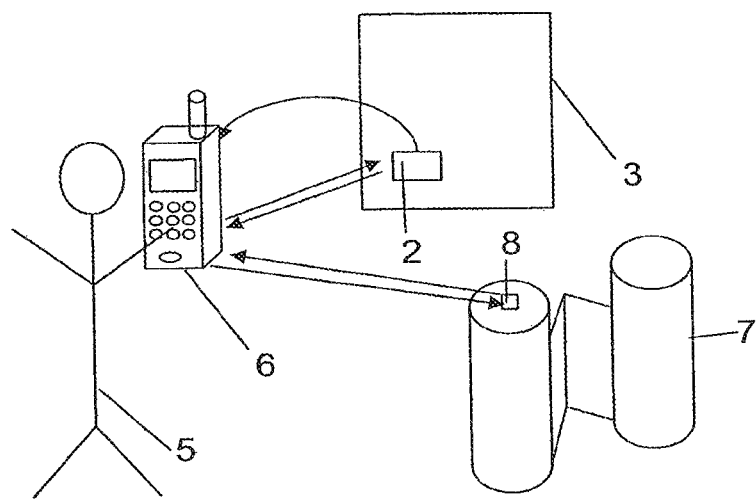

FIG. 26 shows a diagram illustrating an application in which communications apparatus 6 (which may be stand-alone but is shown incorporated in a mobile device) and embodying the invention has dual capabilities in that the communications apparatus 6 may function both as a memory card such as a flash memory card (as described above with reference to FIG. 24 in which the communications apparatus can download data from a communications apparatus 2 carried by a poster 3 or other surface as mentioned above) and also as an electronic ticket, for example a train, tube (subway) or other admission ticket. In this case, the controller of the communications apparatus 6 controls the functionality of the apparatus in dependence on a received RF signal and instructions and/or data contained within the received RF signal. As shown in FIG. 26, when a user 5 presents their dual action communications apparatus 6 embodying the invention to an access gate 7 associated with a communications apparatus 8 (for example comprising an NFC/RFID reader), the controller of the communications apparatus 6 will, in response to RF communication received from the short range wireless radio frequency communicator of the communications apparatus 8, and instruct its short range wireless radio frequency communicator to function in accordance with data and protocols appropriate to the access gate (this data and protocols may be provided by a further functionality module or feature, for example the further functionality 2620 shown in FIG. 23) so that to the access gate's reader the dual action communications apparatus will appear as a traditional RFID device/RFID ticket and, provided the modulated signal supplied by the communications apparatus 6 is verified by the access gate's reader, permission to travel will be provided by the access gate's reader. In addition, as well as allowing access to travel, a transport authority could transfer images and/or other data using high speed data transfer methods between the high data rate data communicators of the communications apparatus 6 and the access gate's reader. The transferred images and/or other data could be used for advertising purposes for example or to provide travel information or other information. As an example, the communications apparatus may in this case be a memory card received within a memory card slot of the mobile device. This communications apparatus may be as described with reference to FIG. 22 where, for example, the electronic ticket is a separate memory card and the mobile device has only one memory card slot.

Figure 27:
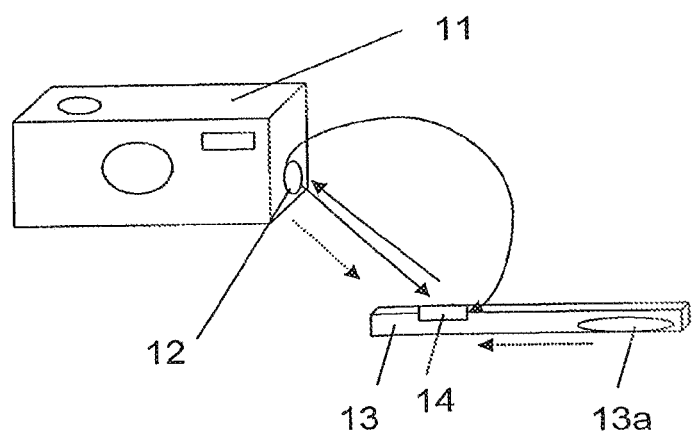

FIG. 27 shows a diagram illustrating a digital camera 11 incorporating a communications apparatus 12 embodying the invention and a memory card, in this example a contactless flash memory card, 13 incorporating a communications apparatus 14 embodying the invention and having a battery 13a as in the examples shown in FIGS. 17 to 19 (with the battery 13a being the battery 1802 in FIGS. 17 to 19). In this application, the switch 1803 (FIGS. 17 to 19) is normally in an open-state, disconnecting the power supply 1802. When the short range wireless radio frequency communicator 1301a is brought within range of the digital camera 11, then the power deriver 1307 provides power for the initiation procedure (indicated by the dotted line from the digital camera 11 to the memory card 13) and, when data transfer via the high data rate communicator is started or initiated by the controller, the controller 1309 controls the switch 1803 so that the power supply 1802 provides power for the data transfer (as indicated by the dotted line from the battery 13a towards the communications apparatus 14). The solid arrow lines in FIG. 27 show data flow directions.

Thus in the example of FIG. 27, initial communication is established using the power supply of the camera 11 to power the communications apparatus 12 within the camera and the RF signal supplied by the communications apparatus 12 within the camera 11 to power the short range wireless radio frequency communicator of the communications apparatus 14. Once initial communication has been established to enable data communication between the high speed data communicators then, provided the battery 13a has sufficient power, the controller of the communications apparatus 14 operates the switch 1803 (see FIGS. 17 to 19) so that the battery 13a is only used during the time period in which the high data rate data communicators are communicating data, for example downloading images from the camera 11 to the memory card 13. Where the battery 13a is rechargeable as in the communications apparatus shown in FIG. 18 or 19, then RF communication via the short range wireless radio frequency communicator may be used to recharge the battery.

This application has the advantage that the memory card need not be specifically designed for a particular type of memory card slot (which provides greater flexibility and may increase reliability) but simply needs to be compatible with the communications apparatus 12. This application has a further advantage that it enables, if desired, the digital camera to have only internal, non-removable memory because the memory card 13 may be used to enable, after the initial short range wireless radio frequency communication, high speed data rate transfer of the camera's internal memory contents to the contactless memory card 13.

The application shown in FIG. 27 may be used where the memory card is always self-powered although this will provide a greater drain on the battery. This battery may or may not be rechargeable via the short range wireless radio frequency communication.

Where the memory card 13 does not rely on the short range wireless communication to provide its power supply, then once communication between the high data rate data communicators is initiated, the user may move out of range of the other short range wireless radio frequency communicator, staying of course within the generally larger communications range of the high speed data rate data communicator. When data transfer is completed, the controller 1309 operates the switch 1803 to disconnect the power supply 1802 to save power. The advantages of this feature are that a user does not have the inconvenience of holding their memory card and digital camera close together for the entirety of the data transfer time.

Although FIG. 27 shows a digital camera, the larger device need not necessarily be a digital camera but could be any of the larger devices mentioned above, for example the larger device may be a computer such as a handheld, laptop, tablet PC or other portable computer, a PDA or a mobile telephone, for example. The applications illustrated by FIG. 27 provide the benefits of a universal memory compatible with any larger device that can comprise or be associated with communications apparatus embodying the invention, that is any device that has the ability to initialise and/or supply power using short range wireless radio frequency communication such as RFID or NFC communication.

In embodiments described above, the short range wireless radio frequency communicator may just provide power and/or initialisation for the data communication by the high data rate data communicator. Alternatively it may comprise a fully functioning short range wireless radio frequency communicator able to act interchangeably firstly to initiate and/or supply power to the high data rate data communicator and secondly to communicate with and transfer data and/or instructions to one or more other short range wireless radio frequency communicators, usually RFID/NFC communicators.

It may be advantageous in certain applications for the short range wireless radio frequency communicator of a communications apparatus embodying the invention and acting as a tag or target to provide only the circuitry necessary to derive a power supply from an RF field supplied by another communications apparatus capable of acting as a reader or initiator. Similarly, in these circumstances, the short range wireless radio frequency communicator of communications apparatus acting as the reader or initiator may simply provide the RF field from which the power supply can be derived. In these cases, the power deriving short range wireless radio frequency communicator will not carry out any modulation or demodulation of incoming RF signals or generate its own RF signals. Rather, in this case initialisation of communications and then data transfer will all be carried out through use of the high-speed data transceiver 1314. Examples of applications for such communications apparatus are passive location-based information services such as a tourist information point, museum artefact multimedia clip storage, historical point of interest, multilingual support for signage (especially at airports for example). In these examples a user would present their communications apparatus embodying the invention (which may be incorporated or embedded, for example, within a mobile device such as a mobile telephone or PDA or may be a dedicated information device intended for use within a museum, for example) and capable of acting as a reader or initiator within a few centimeters of the communications apparatus incorporated or embedded within an information point and acting as a tag or target so that the RF field of the short range wireless radio frequency communicator of the user's communications apparatus provides a power supply to the information point communications apparatus. On generation of sufficient power within the information point communications apparatus, the high data rate data communicators would then communicate to transfer data stored at the information point to the communications apparatus of the mobile telephone or PDA. Such a system has clear cost benefits.

Figure 28:
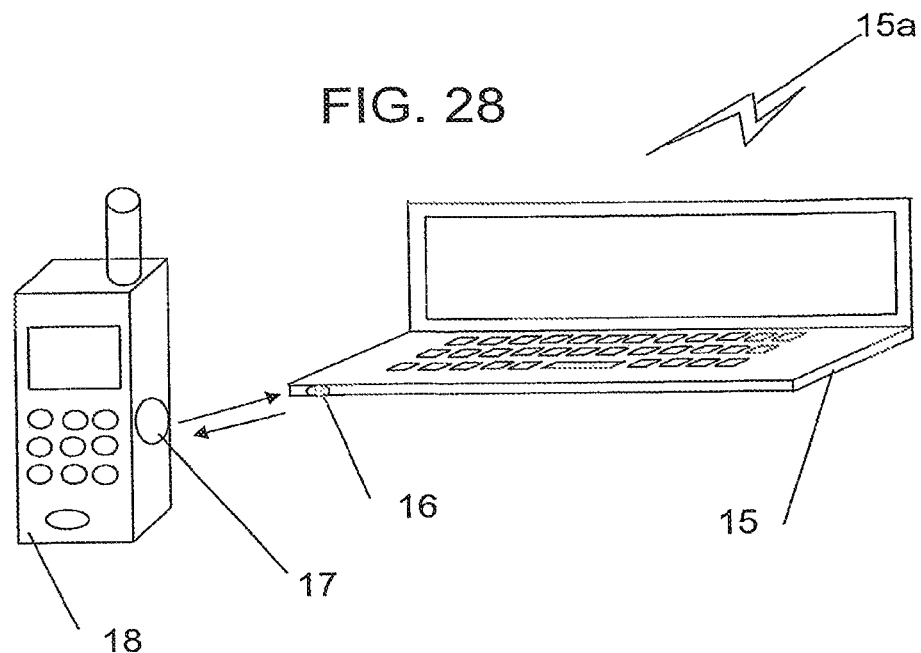

FIG. 28 shows another application in which a device 15 such as a personal computer, a PDA, tablet PC, laptop or the like incorporates or has a memory slot that receives, a plug-in memory card such as a flash memory card 16 incorporating communications apparatus for communicating with another communications apparatus (having, for example an NFC communicator) embodying the invention, which, as shown is incorporated in a mobile device 18 such as a mobile telephone or PDA.

The arrow flash 15a in FIG. 28 indicates the ability of the device 15 to communicate wirelessly (although it could be a wired connection) over a network, for example the Internet.

In this application, when the short range wireless radio frequency communicators of the communications apparatus 16 and 17 of the devices 15 and 18 are in range and short range communication has been established, data may be transferred between the high data rate data communicators of the communications apparatus 16 and 17, for example data may be downloaded from the device 15 to the mobile device 16 via the high data rate data communicators of the communications apparatus 16 and 17. Power for this data transfer may be provided by either or both of the communications apparatus (where self-powered) and/or by either or both of the two devices 15 and 16. One of the two communications apparatus may derive a power supply from the RF field provided by the short range wireless radio frequency communicator of the other communications apparatus. Where a communications apparatus has a switchable power supply as shown in FIGS. 17 to 19, then that power supply may be the power supply of the larger device, and the controller of the communications apparatus may be configured to use that power supply only for communication between the high data rate data communicators so as to save the battery of the larger device 15 or 16.

The data downloaded in the application shown in FIG. 28 may be data obtained via the network connection (indicated by the arrow flash 15a) or from the hard drive of the device 15, for example.

In a further embodiment, the short range wireless radio frequency communicator (for example an RFID tag, RFID reader or NFC communicator as described above) may be provided separately from the high data rate data communicator and, although the short range wireless radio frequency communicator and high data rate data communicator may operate independently in conventional fashion, the functionality of the communications apparatus will only be achieved once respective controllers of the high data rate communicator and the short range wireless radio frequency communicator can communicate, that is once the high data rate communicator and the short range wireless radio frequency communicator are either connected or within sufficient proximity to one another. Thus, in this example, prior to operation the two separate communicators have to be combined by the user. This may have advantage where pre-existing systems for either short range wireless radio frequency communication or high data rate transfer exist within a larger device or where the user wants flexibility in the way in which the communications apparatus is used. The coupling between the short range wireless radio frequency communicator and the high data rate data communicator may be contactless (for example via RF), contact based or wire based. One of the short range wireless radio frequency communicator and the high data rate data communicator may be provided within a larger device such as a mobile device (for example a mobile telephone or PDA) or any other form of computing apparatus whilst the other of the short range wireless radio frequency communicator and the high data rate data communicator may be within a component which can be physically connected to the larger device or held within the proximity of the larger device, for example the component may be a plug-in component such as a memory card receivable in a memory card slot of the larger device such as a mobile device or computer so that, when a user wishes to download data through a high data rate link, the user associates the short range wireless radio frequency communicator with his preferred high data rate data communicator (for example in FIG. 28 the device 15 may already contain a short range wireless radio frequency communicator and 16 may represent high data rate data communicator in the form of a flash memory card, key card, SIM card, USB card or the like inserted into an appropriate card slot). The short range wireless radio frequency communicator can then be used to initialise (whether simply as a result of power derivation or via RFID communication with a second NFC/RFID communicator) the required data transfer by the high data rate communicator.

Data communicated by communications apparatus embodying the invention may comprise any type of data, for example at least one of: audio data; text data; video data; image data; graphics data; authorisation data; verification data; identification data; executable code; a computer program, a sub-routine, upgrade, patch for a computer program; credit card, banking details or other financial data; website details; upgrade information; and compressed and/or encrypted versions of any of the preceding types of data.

Figure 29:
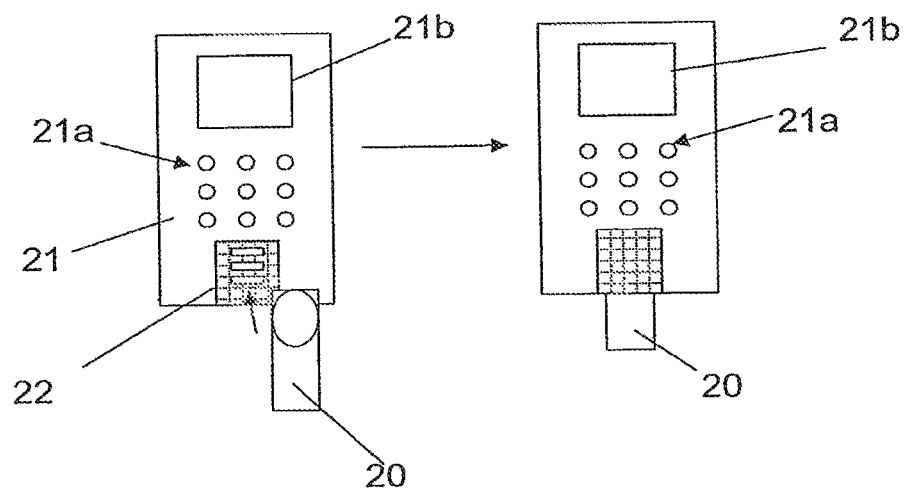

Communications apparatus embodying the invention may be configured to store executable code for a video game or board game, for example. In such an application, the communications apparatus may be embedded within a toy, game token, or card for example. FIG. 29 illustrates an example in which a memory card 20 having a communications apparatus 21 embodying the invention plugs in to a slot 22 in a games console 21 having a keypad 21a and a display 21b. In this example, the high data rate data communicator provides the ability to transfer quickly between games consoles of two different users significant amounts of game code that could dramatically alter the game-play in a short space of time so that the user does not get bored waiting.

As will be appreciated from the above, communications apparatus embodying the invention may take the form of a secure electronic token, card, hot-swappable memory device or the like.

As mentioned above, the high data rate data communicator of communications apparatus embodying the invention may be able to communicate over a longer range than the short range wireless radio frequency communicator so that, once data communication by two high data rate data communicators has been initiated, a user of communications apparatus embodying the invention may move his or her communications apparatus away from the other communications apparatus while the data communication is still in progress, (for example the user may walk away to carry out another activity), provided the communications apparatus can maintain a power supply after the short range wireless radio frequency communicators move out of range. Where a communications apparatus is not-self-powered and is not associated with a device from which it can derive power, then that communications apparatus may have an energy storage device (such as a rechargeable battery or energy storage capacitor) that is charged up during the short range wireless radio frequency communication so that it can maintain a sufficient power supply for the data communication between the high data rate data communicators to be completed even if the short range wireless radio frequency communication is terminated.

Even where the high data rate data communicators provide a greater data communication range than the short range wireless radio frequency communicators, the data communication should occur more rapidly than via the short range wireless radio frequency communicators so reducing the amount of time the user has to wait for the download. Moreover, the use of the high data rate communicators should reduce power consumption and reduce the likelihood of transmission data collisions because of the shorter time required for the data communication.

It will of course be appreciated that whether or not authorisation data and/or security or encryption is required will depend upon the particular application for which the communications apparatus is to be used and that there are applications in which there is no need, necessarily, for any security, encryption or payment transaction algorithm or authorisation.

As set out above, the short range wireless radio frequency communicator may comprise any appropriate communicator using an RF field to at least one of transmit and receive power and/or to at least one of transmit and receive data. For example, a short range wireless radio frequency communicator may be any of the following or a combination of the following:

An RFID reader (or transceiver) that transmits an RF signal to enable inductive coupling between the RFID reader and any RFID tag or NFC communicator operating in target mode. The transmitted RF signal may or may not be modulated by the reader in accordance with data and/or commands stored within the reader. Such a reader will be capable of receiving modulated RF signals (for example modulation of its own previously generated signal, a new RF signal or a modulated new RF signal). The reader may derive power from such a received signal. It may demodulate the received RF signal and respond to the received RF signal in accordance with any data and/or instructions contained within such an RF signal and/or data stored within the reader. Example RFID readers are described in various international standards, ISO/IEC 14443, ISO/IEC 15693;

An RFID tag (or transponder) that, when in the vicinity or range of (that is when inductively coupled to) a suitable RF signal (for example from an RFID reader or NFC communicator), will receive the RF signal and where necessary demodulate that RF signal. The tag may be a passive tag that does not have its own power supply but derives a power supply from a received RF signal. As another possibility, such a tag may have its own power supply, for example a battery. As another possibility, such a tag may use a combination of its own power supply and a power supply derived from a received RF signal. The tag will respond to a received RF signal in accordance with any data and/or instructions contained within such an RF signal and/or data stored within the tag itself by modulating the received RF signal (usually in a manner referred to as load modulation) and/or by modulating another RF signal which may or may not be directly related to the received RF signal. Example RFID tags are described in various international standards, ISO/IEC 14443, ISO/IEC 15693;

An NFC communicator. Such communicators comprise both RFID reader and RFID tag functionality within the same device or apparatus. The function of the NFC communicator depends on the mode of operation and the status of the apparatus (referred to as 'initiator' and 'target' in the standards). When in target mode the NFC communicator acts in a similar fashion to the RFID tag described above. When in initiator mode, the NFC communicator initiates or supplies an RF signal. Examples of NFC communicators are described in ISO/IEC 18092 and ISO/IEC 21481.

Any other form of communications apparatus that uses a short range, low power RF field to communicate directly with another short range wireless radio frequency communicator, as an example any device in which inductive coupling is used to supply or derive power and/or send and/or receive data.

The high data rate data communicator may comprise any communicator able to communicate (receive and/or send) or transfer data at high rate directly to another high data rate data communicator. For example high data rate data communicator may comprise a wireless ultra wide band device (for example those referred to in the DS-UWB and MBOA (wireless USB) standards), a portable USB device, a high data rate Bluetooth RF communication technology device, a flash memory card or other memory card. As another example, the wired or wireless high-speed data method xMax newly developed by xG Technology which uses a modulation method that sends a clock/synchronization signal via a single carrier (at a fairly high level/strength) and then sends data on nearby frequencies, but at very low levels (below noise floor of conventional receivers), may be used.

The high data rate transfer device may, as another possibility, be contact based or utilize wire connections for the transfer of data (for example flash memory cards, USB devices) or may use infra red or other optical communications techniques.

The short range wireless radio frequency communicator and high data rate data communicator may be provided within a single device housing and may be provided by, for example, one or more integrated circuits. As another possibility, the short range wireless radio frequency communicator and high data rate data communicator may be provided within separate housings and may each be provided as one or more integrated circuits. For example, the high data rate data communicator may be provided by one integrated circuit and the short range wireless radio frequency communicator by another integrated circuit with communication between the two being controlled by an interface or controller. As another possibility, the short range wireless radio frequency communicator and high data rate data communicator may share or have in common parts of their functionality.

As set out above, communication apparatus embodying the invention may be in standalone form (either hand-held or free-standing) or provided within or carried by a larger device or host device or system examples of which are set above, for example a mobile communications device, such as a mobile telephone, a personal digital assistant (PDA), personal computer, vending machine etc. Where parts of the communication apparatus are separate or distinct, those parts may form part of or be comprised within a respective larger device or host device/system. For example, the high data rate data communicator may be comprised within a hand-held memory card such as a flash memory card or stick and the short range wireless radio frequency communicator comprised within a larger device such as a mobile communications device, personal digital assistant (PDA), personal computer, vending machine etc.

Where the communication apparatus is comprised within a larger device or host device/system (either as a single unit or as separate units), apparatus functions may be shared between the apparatus and the larger device or host device/system. For example, the communications apparatus may not have its own memory and may instead rely on memory provided within the larger device. Functionality of the short range wireless radio frequency communicator and/or high data rate data communicator or the interface between these may be controlled by a host processor within the larger device or host device/system.

In embodiments described above, the short range wireless radio frequency communicator may just provide power and/or initialisation for the high data rate transfer by the high data rate data communicator or it may comprise a fully functioning RFID or NFC communicator and be able to initiate data transfer and/or supply power to the high data rate data communicator and to communicate control instructions and data with another short range wireless radio frequency communicator or short range wireless radio frequency communicators, that is in the latter case the short range wireless radio frequency communicator may be a fully functioning RFID or NFC communicator. As another possibility, the short range wireless radio frequency communicator may be any suitable form of short range RF field communicator that is configured to provide an RF field such that a second such RF field communicator (which may or may not be inductively coupled to the first RF field communicator) may derive a power supply from the RF field but may not, however, be capable of receiving/interpreting a modulated signal or of sending its own modulated signal. The frequency of the said RF field may be different to any of the frequencies commonly used for RFID communicators.

Where a user input interface is provided, it may be used to control operation of the communications apparatus. For example, user input may be used to confirm a payment instruction or acceptance of a transaction initialised by the short range wireless radio frequency communicator.

As set out above, further functionality may be provided. The further functionality may be used as a mechanism to re-program or re-configure the communications apparatus.

As another possibility or additionally, the further functionality may provide additional or further short range wireless radio frequency communicator functionality. For example such further functionality could comprise a separate memory for the short range wireless radio frequency communicator 1301a and enable full communication and/or interaction with other short range wireless radio frequency communicators where that was not possible without the further functionality or to provide dual functionality. The further functionality may comprise data and/or protocols necessary for the short range wireless radio frequency communicator to act as an ISO/IEC 14443a compatible tag.

Apparatus of the present invention may be adapted such that, where required, security, encryption and/or payment data is transferred during the initialisation procedure and/or during the data transfer via the high data rate data communicator.

In the description of some of FIGS. 4 to 12 above specific forms of controllers are mentioned. It will of course be appreciated that any form of controller suitable for controlling operation of the communications apparatus, for example a state machine, a microcontroller, a microprocessor or a RISC processor, may be used in the short range wireless radio frequency communicators illustrated in those Figures.

As described above, in an embodiment communications apparatus has a short range wireless radio frequency communicator capable of at least one of seeking to initiate short range communication by transmitting an RF signal and of responding to such initiation so that communication between two short range wireless radio frequency communicators occurs when an antenna of a short range wireless radio frequency communicator seeking to initiate communication by transmitting an RF signal is in range of or comes into range of the antenna of another short range wireless radio frequency communicator responsive to such initiation so that the magnetic field of the RF signal transmitted by the short range wireless radio frequency communicator seeking to initiate communication is inductively coupled to the antenna of the short range wireless radio frequency communicator responsive to such initiation to enable communication of at least one of power and data between the short range wireless radio frequency communicators. The communications apparatus also has a high data rate data communicator for communicating directly with another high data rate data communicator to at least one of receive and transmit data when the short range wireless radio frequency communicator has communicated with another in-range short range wireless radio frequency communicator.

The invention claimed is:

1. An apparatus, comprising:
a first communication device configured to:
initiate communication with a second communication device to enable communication between the first communication device and the second communication device in accordance with a first communication protocol;
derive a power supply from a communication signal received from the second communication device; and
perform an initialization procedure; and
a third communication device coupled to the first communication device configured to:
wirelessly communicate with a fourth communication device in accordance with a second communication protocol that is different from the first communication protocol, the third communication device comprising:
a switch configured to:
couple the third communication device to an energy storage device at times where the power supply is not being provided by the first communication device;
decouple the third communication device from the energy storage device at times where the power supply is being provided by the first communication device: and
couple the third communication device to the energy storage device at times where the power supply is being provided by the first communication device to charge the energy storage device;
wherein the first communication protocol comprises a short range wireless radio frequency communication protocol; and
wherein the second communication protocol comprises a long range wireless radio frequency communication protocol, wherein the short range wireless radio frequency communication protocol is able to communicate over a shorter range than the long range wireless radio frequency communication protocol.

2. The apparatus according to claim 1, wherein the short range wireless radio frequency communication protocol comprises:
a radio-frequency identification (RFID) protocol; or
a near field communication (NFC) protocol.

3. The apparatus according to claim 1, wherein the long range wireless radio frequency communication protocol comprises:
a wireless universal serial bus (USB) communication protocol; or
a Bluetooth communication protocol.

4. The apparatus according to claim 1, wherein the energy storage device is chargeable or rechargeable.

5. The apparatus according to claim 4, wherein the third communication device further comprises:
a charging energy supplier configured to provide charging energy to the energy storage device.

6. The apparatus according to claim 4, wherein the third communication device further comprises:
a contactless coupling configured to:
inductively receive a charging energy, and provide the charging energy to the energy storage device.

7. The apparatus according to claim 4, wherein the power supply is configured to provide charging energy to the energy storage device.

8. The apparatus according to claim 1 further comprising a user indicator coupled to the first communication device and the third communication device, the user indicator configured to indicate user information about the apparatus to a user.

9. The apparatus according to claim 1, wherein the communication of the first communication device and the communication of the third communication device are provided by an antenna within the first communication device.

10. An apparatus, comprising:
a first communication device configured to:
derive a power supply from a communication signal that is received in accordance with a first communication protocol; and
perform an initialization procedure; and a second communication device coupled to the first communication device configured to:
  wirelessly communicate in accordance with a second communication protocol that is different from the first communication protocol, the second communication device comprising:
    a switch configured to:
      couple the second communication device to the energy storage device at times where the power supply is not being provided by the first communication device;
      decouple the second communication device from the energy storage device at times where the power supply is being provided by the first communication device: and
      couple the second communication device to the energy storage device at times where the power supply is being provided by the first communication device to charge the energy storage device;
  wherein the first communication protocol comprises a short range wireless radio frequency communication protocol; and
  wherein the second communication protocol comprises a long range wireless radio frequency communication protocol, wherein the short range wireless radio frequency communication protocol is able to communicate over a shorter range than the long range wireless radio frequency communication protocol.

11. The apparatus according to claim 10, wherein the short range wireless radio frequency communication protocol comprises:
  a radio-frequency identification (RFID) protocol; or a near field communication (NFC) protocol.

12. The apparatus according to claim 10, wherein the long range wireless radio frequency communication protocol comprises:
  a wireless universal serial bus (USB) communication protocol; or
  a Bluetooth communication protocol.

13. The apparatus according to claim 10, wherein the energy storage device is chargeable or rechargeable.

14. The apparatus according to claim 13, wherein the second communication device further comprises:
  a charging energy supplier configured to provide charging energy to the energy storage device.

15. The apparatus according to claim 13, wherein the second communication device further comprises:
  a contactless coupling configured to:
    inductively receive a charging energy; and
    provide the charging energy to the energy storage device.

16. The apparatus according to claim 13, wherein the power supply is configured to provide charging energy to the energy storage device.

17. The apparatus according to claim 10 further comprising a user indicator coupled to the first communication device and the second communication device, the user indicator configured to indicate user information about the apparatus to a user.

18. The apparatus according to claim 10, wherein the communication of the first communication device and the communication of the second communication device are provided by an antenna within the first communication device.

* * * * *